United States Patent
Ibata et al.

(10) Patent No.: US 12,078,614 B2
(45) Date of Patent: Sep. 3, 2024

(54) ULTRASOUND PROBE

(71) Applicant: Mitsubishi Electric Corporation, Tokyo (JP)

(72) Inventors: Koji Ibata, Tokyo (JP); Rokuzo Hara, Tokyo (JP); Tomonori Kimura, Tokyo (JP); Yasuhiro Nishioka, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 296 days.

(21) Appl. No.: 17/713,454

(22) Filed: Apr. 5, 2022

(65) Prior Publication Data
US 2022/0229021 A1 Jul. 21, 2022

Related U.S. Application Data

(63) Continuation of application No. PCT/JP2019/046754, filed on Nov. 29, 2019.

(51) Int. Cl.
*G01N 29/24* (2006.01)
*B06B 1/04* (2006.01)

(52) U.S. Cl.
CPC ......... *G01N 29/2412* (2013.01); *B06B 1/045* (2013.01)

(58) Field of Classification Search
CPC ........ G01N 29/2412; B06B 1/045; B06B 1/04
See application file for complete search history.

(56) References Cited

U.S. PATENT DOCUMENTS 3,583,213 A * 6/1971 Houck ............... G01N 29/2412
73/600
5,813,280 A * 9/1998 Johnson .................. G01L 1/255
73/761

FOREIGN PATENT DOCUMENTS

| JP | 61-135297 A | 6/1986 |
| JP | 2002-277336 A | 9/2002 |
| JP | 2007-5872 A | 1/2007 |

* cited by examiner

*Primary Examiner* — Xin Y Zhong
(74) *Attorney, Agent, or Firm* — Birch, Stewart, Kolasch & Birch, LLP

(57) ABSTRACT

An ultrasound probe includes: a metal case including a bottom wall portion having a vibration surface, and a side wall portion connected to the bottom wall portion; a coil mounted on one surface of the side wall portion; and a magnet mounted in such a way as to sandwich the coil between the magnet and the one surface of the side wall portion, in which the coil causes an eddy current to occur in the one surface of the side wall portion, and causes the bottom wall portion to vibrate, by using a Lorentz force occurring in the side wall portion because of the interaction between the eddy current and a magnetic field generated by the magnet.

10 Claims, 16 Drawing Sheets

Top View

Side View

Top View

Side View

Top View

Side View

Top View

Side View

Top View

Side View

Top View

Side View

ULTRASOUND PROBE

CROSS REFERENCE TO RELATED APPLICATIONS

This application is a Continuation of PCT International Application No. PCT/JP2019/046754 filed on Nov. 29, 2019, which is hereby expressly incorporated by reference into the present application.

TECHNICAL FIELD

The present invention relates to an ultrasound probe.

BACKGROUND ART

As for inspection methods capable of inspecting the interior of an object nondestructively, inspection methods using an ultrasonic wave are known. For ultrasonic nondestructive inspections, an ultrasound probe using a thickness longitudinal oscillation of a piezoelectric element is typically used.

On the other hand, as for methods of performing generation and detection of an ultrasonic wave for a test object, such as a metal plate or tube, in a noncontact manner, methods using an electromagnetic acoustic transducer (EMAT) (referred to as EMAT hereinafter) are known (for example, refer to Patent Literature 1). An EMAT typically includes a coil through which a high frequency current flows, and a magnetic field generation portion, such as a permanent magnet, which provides a static magnetic field for a test object. The EMAT causes a Lorentz force to occur by means of the interaction between an eddy current occurring in a front surface of the test object because of the high frequency oscillation of the current flowing through the coil, and the static magnetic field caused in the test object by the magnetic field generation portion, so that the Lorentz force causes the test object to vibrate.

CITATION LIST

Patent Literature

Patent Literature 1: JP 2002-277336 A

SUMMARY OF INVENTION

Technical Problem

For example, when performing an inspection of a concrete structure which constitutes a large-scale facility, it is desirable to use an ultrasonic wave of low frequency in consideration of a propagation loss and so on. However, there arises a problem that in order for such an ultrasound probe as above using a piezoelectric element to excite an ultrasonic wave of low frequency, it is necessary to increase the size of the ultrasound probe.

Further, in the case of using an EMAT, because it is necessary to cause an eddy current to occur in a front surface of a test object, as mentioned above, the test object is limited to a conductor such as a metal object. Therefore, a problem with EMATs is that it is impossible to perform an inspection on anon-conductive test object such as a concrete structure.

The present invention is made in order to solve the above-mentioned problems, and it is therefore an object of the present invention to provide a technique capable of achieving downsizing of an ultrasound probe and performing an ultrasonic nondestructive inspection on a non-conductive test object.

Solution to Problem

An ultrasound probe according to the present invention, includes: a metal case including a bottom wall portion having a vibration surface, and a side wall portion connected to the bottom wall portion; a coil mounted on one surface of the side wall portion; and a magnet mounted in such a way as to sandwich the coil between the magnet and the one surface of the side wall portion, in which the coil causes an eddy current to occur in the one surface of the side wall portion, and causes the bottom wall portion to vibrate, by using a Lorentz force occurring in the side wall portion because of the interaction between the eddy current and a magnetic field generated by the magnet.

Advantageous Effects of Invention

According to the present invention, downsizing of the ultrasound probe can be achieved and an ultrasonic nondestructive inspection can be performed on a non-conductive test object.

DESCRIPTION OF EMBODIMENTS

Hereinafter, in order to explain the present invention in greater detail, embodiments of the present invention will be explained with reference to the accompanying drawings.

Embodiment 1

Figure 1:
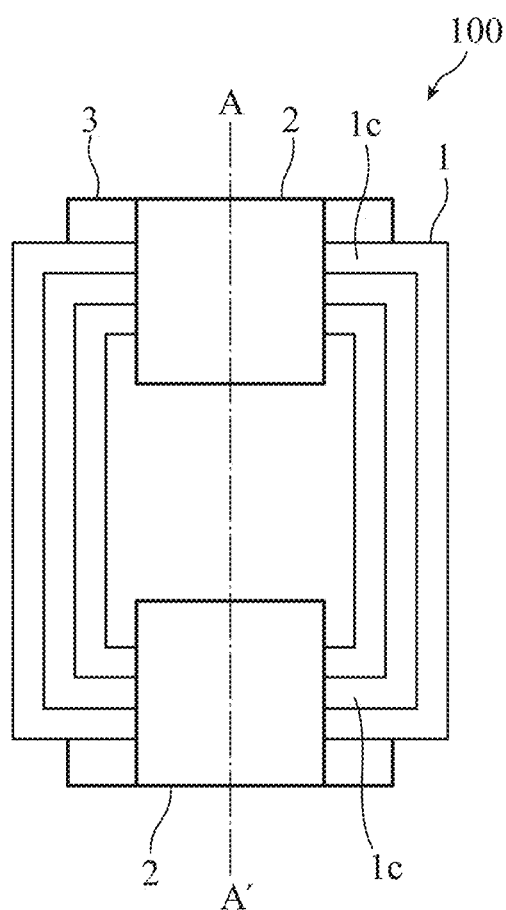
FIG. 1 is a schematic diagram showing the structure of an ultrasound probe according to Embodiment 1.
Figure 2:
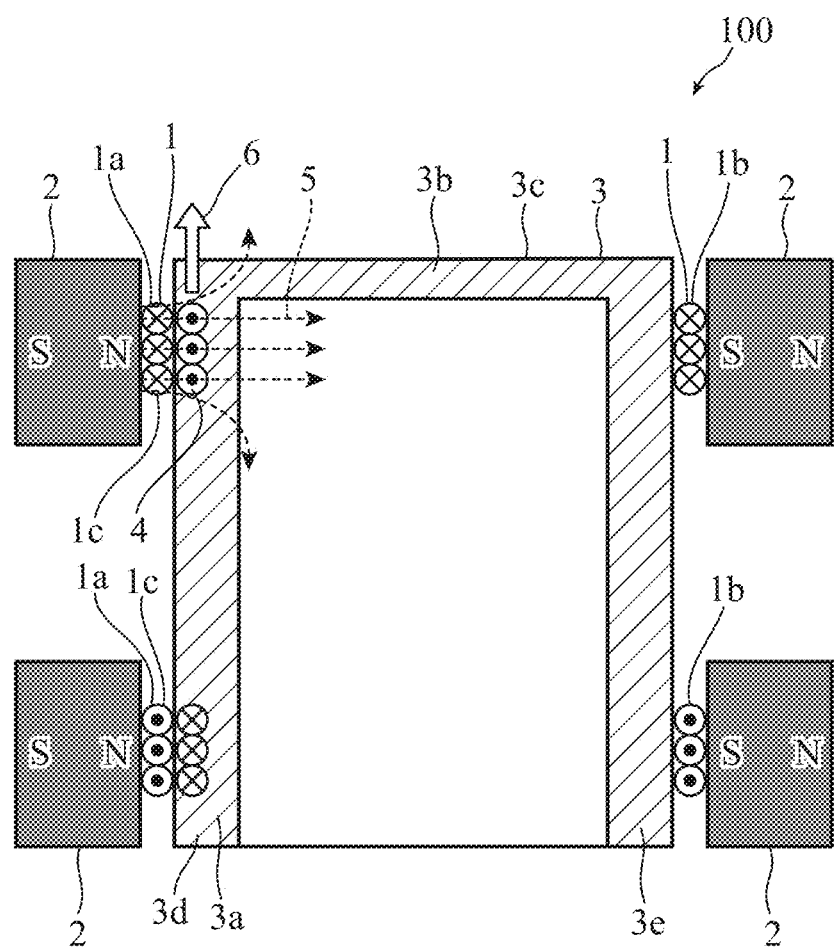
FIG. 2 is a cross-sectional view of the ultrasound probe taken along the dotted line AA' shown in FIG. 1.

FIG. 1 is a schematic diagram showing the structure of an ultrasound probe 100 according to Embodiment 1. FIG. 2 is a cross-sectional view of the ultrasound probe 100 taken along the dotted line AA' shown in FIG. 1. As shown in FIGS. 1 and 2, the ultrasound probe 100 includes a coil 1, magnets 2 and a metal case 3.

The metal case 3 includes a bottom wall portion 3b having a vibration surface 3c, and a side wall portion 3a connected to the bottom wall portion 3b. In Embodiment 1, the side wall portion 3a of the metal case 3 includes a first flat-shaped side wall portion 3d and a second flat-shaped side wall portion 3e which face each other.

Further, in Embodiment 1, the bottom wall portion 3b of the metal case 3 includes a single flat-shaped bottom wall portion, and its flat surface opposite to the vibration surface 3c is connected to ends of the respective first and second side wall portions 3d and 3e. As a result, the metal case 3 according to Embodiment 1 has a shape of the letter U. The material of the metal case 3 is, for example, a conductive material such as aluminum.

The coil 1 is mounted on one surface of the side wall portion 3a of the metal case 3. In further detail, in Embodiment 1, the ultrasound probe 100 includes, as the coil 1, a first coil 1a mounted on a first surface of the first side wall portion 3d, the first surface being opposite to a second surface, of the first side wall portion 3d, facing the second side wall portion 3e, and a second coil 1b mounted on a first surface of the second side wall portion 3e, the first surface being opposite to a second surface, of the second side wall portion 3e, facing the first side wall portion 3d. Although the structure in which the ultrasound probe 100 includes the two coils: the first coil 1a and the second coil 1b is explained in Embodiment 1, the ultrasound probe 100 may include either a single coil or three or more coils.

In Embodiment 1, each of the first and second coils 1a and 1b is one in which a conducting wire made of metal such as copper is wound two or more times in the shape of a track. Further, each of the first and second coils 1a and 1b is connected to a not-illustrated alternating current power supply.

The magnet 2 is mounted in such a way as to sandwich the coil 1 between the magnet and the one surface of the side wall portion 3a. In Embodiment 1, the ultrasound probe 100 includes, as the magnet 2, at least one or more magnets 2 mounted in such a way as to sandwich the first coil 1a between the one or more magnets and the first surface of the first side wall portion 3d, the first surface being opposite to the second surface, of the first side wall portion 3d, facing the second side wall portion 3e, and at least one or more magnets 2 mounted in such a way as to sandwich the second coil 1b between the one or more magnets and the first surface of the second side wall portion 3e, the first surface being opposite to the second surface, of the second side wall portion 3e, facing the first side wall portion 3d. Although four magnets 2 in total are shown in FIG. 2, the number of magnets 2 which the ultrasound probe 100 includes is not especially limited.

Next, the operation of the ultrasound probe 100 according to Embodiment 1 will be explained. The coil 1 causes an eddy current to occur in the one surface of the side wall portion 3a, and then causes the bottom wall portion 3b to vibrate, by using a Lorentz force occurring in the side wall portion 3a because of the interaction between the eddy current and a magnetic field generated by the magnet 2. In other words, by using the same method as that of above-mentioned EMATs, the coil 1 causes a vibration to occur in the side wall portion 3a and thus causes the bottom wall portion 3b to vibrate.

In further detail, for example, when an alternating current flows through the first coil 1a, as shown in FIG. 2, an eddy current 4 of reversed polarity flowing in a direction opposite to a direction in which the alternating current flows occurs in one surface of the first side wall portion 3d. On the other hand, a magnet 2 shown in an upper left part of FIG. 2 causes a static magnetic field 5 to occur in the one surface of the first side wall portion 3d. The interaction between the eddy current 4 and the static magnetic field 5 causes a Lorentz force 6 to occur in the one surface of the first side wall portion 3d.

Here, because the alternating current flows through the first coil 1a, the polarity of the eddy current 4 changes in response to the polarity of the current flowing through the first coil 1a. Because, as a result of this, the direction of the Lorentz force 6 also changes, a vibration occurs in the first side wall portion 3d because of the change in the direction of the Lorentz force 6.

In Embodiment 1, the coil 1 has a straight line portion 1c parallel to the vibration surface 3c of the bottom wall portion 3b, and the magnet 2 is mounted in such a way as to sandwich the straight line portion 1c of the coil 1 between the magnet and the one surface of the side wall portion 3a. For example, the first coil 1a has a straight line portion 1c parallel to the vibration surface 3c of the bottom wall portion 3b, and a magnet 2 is mounted in such a way as to sandwich the straight line portion 1c of the coil 1 between the magnet and the one surface of the first side wall portion 3d.

According to the structure, the direction of the Lorentz force 6 occurring in the above-mentioned way in the first side wall portion 3d is perpendicular to the vibration surface 3c of the bottom wall portion 3b, and a bending vibration occurs in the bottom wall portion 3b. Therefore, when a not-illustrated test object is brought into contact with the vibration surface 3c of the bottom wall portion 3b, an ultrasonic wave is excited in the test object by the bending vibration.

Further, because the bending vibration of the bottom wall portion 3b responds to the high-frequency oscillation of the current flowing through the coil 1, the frequency of the ultrasonic wave excited in the test object by the bending vibration of the bottom wall portion 3b is determined by the frequency of the current flowing through the coil 1. Therefore, because the frequency of the ultrasonic wave excited in the test object does not depend on the size of the ultrasound probe 100, it is possible to excite an ultrasonic wave of low frequency in the test object without increasing the size and the weight of the ultrasound probe 100.

Figure 3:
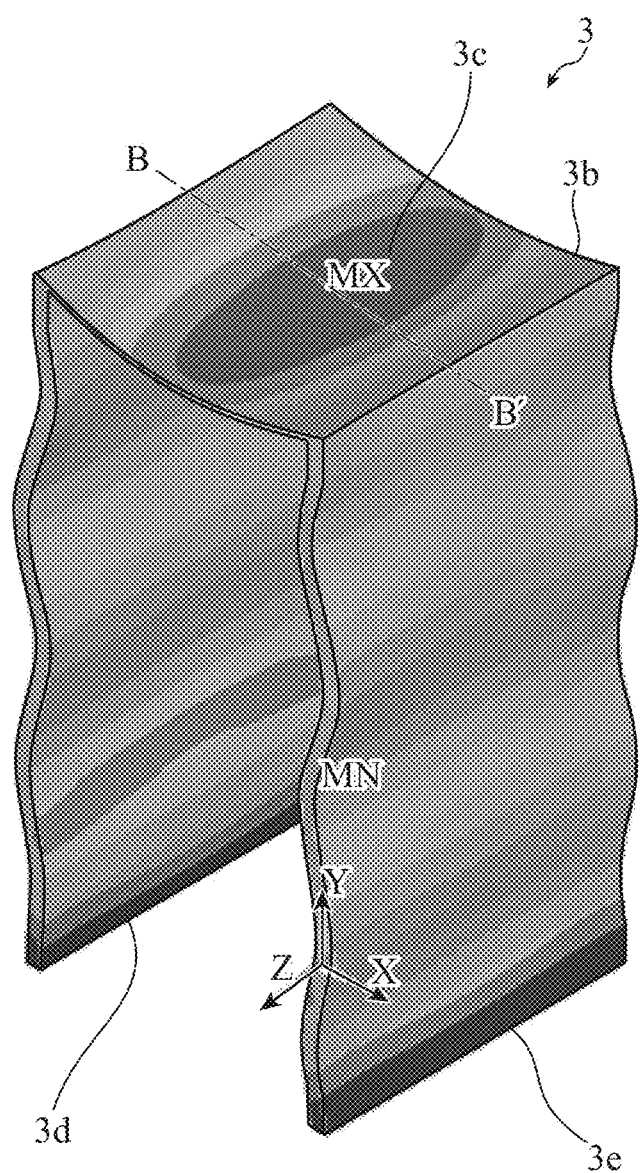
FIG. 3 is a view showing a result of determining the shape of a metal case according to Embodiment 1 after deformation when a stress caused by a Lorentz force is applied to a side wall portion of the metal case, by means of simulation.
Figure 4:
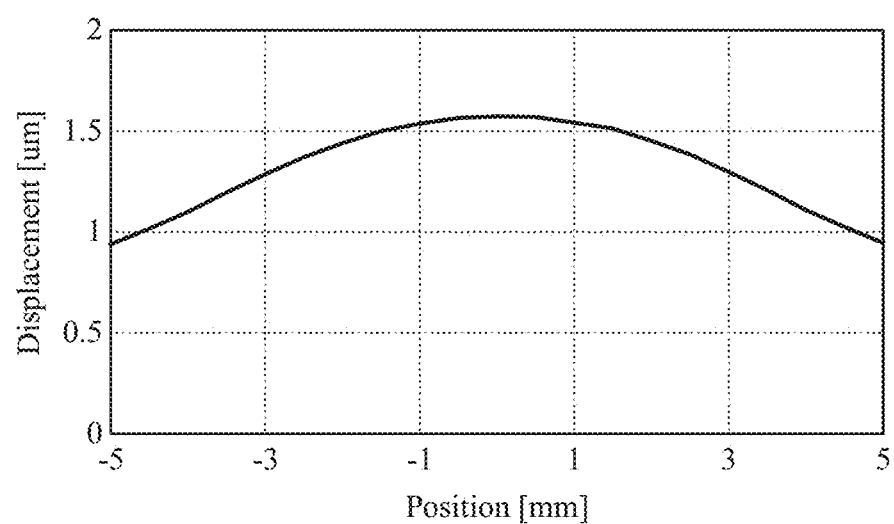
FIG. 4 is a graph showing a vibration displacement on a center line of a vibration surface of a bottom wall portion of the metal case according to Embodiment 1 and in a direction perpendicular to the vibration surface.

Next, a result of a simulation of the operation of the ultrasound probe 100 according to Embodiment 1 will be explained by reference to drawings. FIG. 3 is a view showing a result of determining the shape of the metal case 3 after deformation when stresses caused by Lorentz forces mentioned previously are applied to the first side wall portion 3*d* and the second side wall portion 3*e* of the metal case 3, by means of the simulation. FIG. 4 is a graph showing a vibration displacement on a center line of the vibration surface 3*c* of the bottom wall portion 3*b* and in a direction perpendicular to the vibration surface 3*c*. The center line of the vibration surface 3*c* is a dotted line BB' shown in FIG. 3. Further, the horizontal axis of the graph shown in FIG. 4 shows positions on the center line BB' in a case where the center of the vibration surface 3*c* is set as the point of origin, and the vertical axis of the graph shown in FIG. 4 shows the magnitude of the vibration displacement in the direction perpendicular to the vibration surface 3*c*.

In the vibration surface 3*c* of FIG. 3, a dark portion compared with the surrounding area is a bending portion. Further, it is shown in FIG. 4 that the vibration displacement becomes larger with increasing proximity to the center of the vibration surface 3*c*. More specifically, it can be recognized that the bottom wall portion 3*b* has a bending vibration. This bending vibration makes it possible to excite an ultrasonic wave in the test object.

Figure 5:
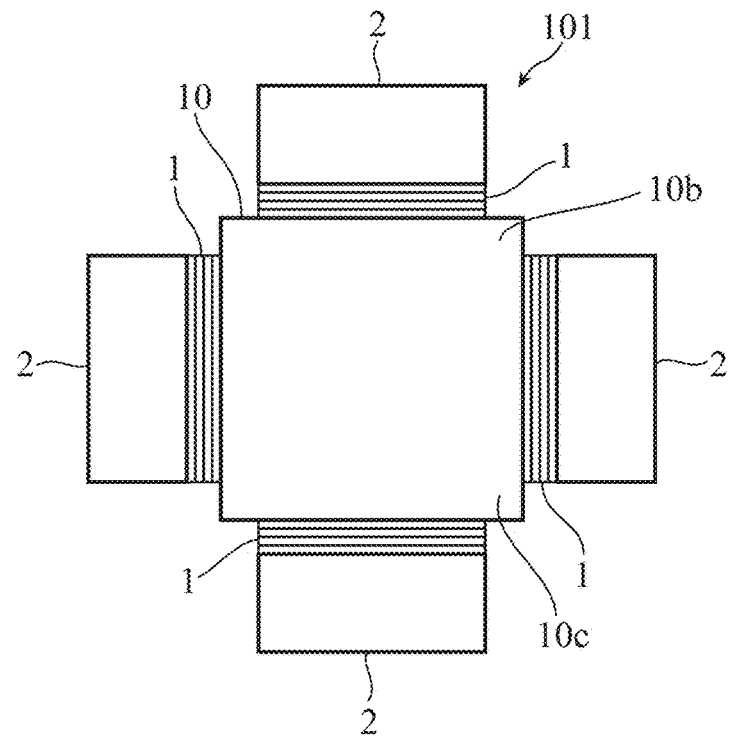
FIG. 5 is a top view and a side view showing the structure of an ultrasound probe according to a first variant of Embodiment 1.
Figure 5:
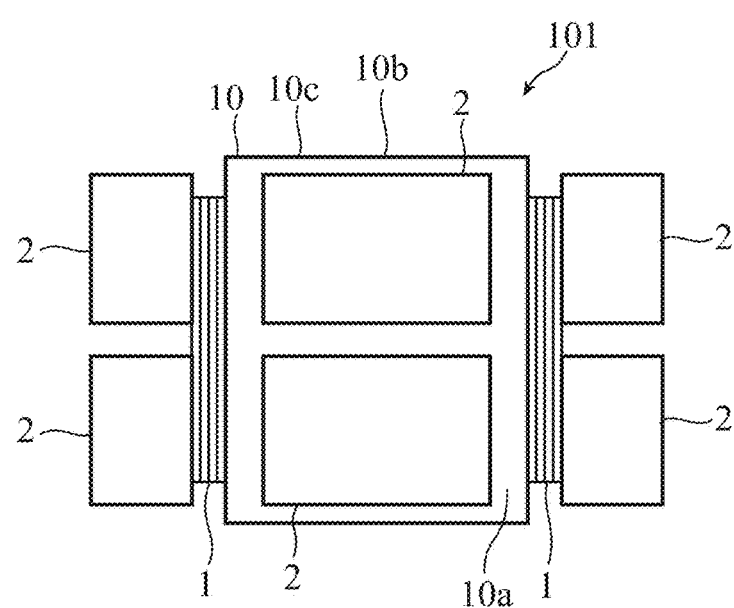

Next, a first variant of the ultrasound probe 100 will be explained by reference to a drawing. FIG. 5 is a top view and a side view showing the structure of an ultrasound probe 101 according to the first variant. As shown in FIG. 5, a metal case 10 of the ultrasound probe 101 has a polygonal prism shape in which a side wall portion 10*a* is defined as a side face and a bottom wall portion 10*b* is defined as one bottom face.

Further, the ultrasound probe 101 includes a number of combinations each having a coil 1 and at least one or more magnets 2, the number of combinations being equal to the number of multiple planes in an outer surface of the side wall portion 3*a*. Each of the combinations whose number is equal to the number of multiple planes is mounted on a corresponding plane out of the multiple planes in such a way that the combinations are arranged at positions which are mutually rotationally symmetric with respect to an axis passing through the center of the vibration surface 10*c* of the bottom wall portion 10*b* and being perpendicular to the vibration surface 10*c* of the bottom wall portion 10*b*.

In further detail, in this first variant, the metal case 10 has a quadrangular prism shape in which the side wall portion 10*a* is defined as a side face and the bottom wall portion 10*b* is defined as one bottom face. The ultrasound probe 101 includes, as the coil 1, four coils 1 each of which is mounted on a corresponding plane out of four planes in the outer surface of the side wall portion 10*a*.

Further, the ultrasound probe 101 includes, as the magnet 2, eight magnets 2 each of which is mounted in such a way as to sandwich a corresponding coil out of the multiple coils 1 between each of the magnets and a corresponding plane out of the four planes in the outer surface of the side wall portion 10*a*.

In this first variant, the example in which the shape of the metal case 10 is a quadrangular prism one and the number of combinations each having a coil 1 and at least one or more magnets 2 is four is explained. However, the shape of the metal case 10 is not limited to this structure, but should just be a polygonal prism one. Further, the number of combinations each having a coil 1 and at least one or more magnets 2 which the ultrasound probe 101 includes is not especially limited.

According to the structure of the first variant, a previously-mentioned Lorentz force occurring in the side wall portion 10*a* can be effectively propagated to the center of the vibration surface 10*c* of the bottom wall portion 10*b*.

Figure 6:
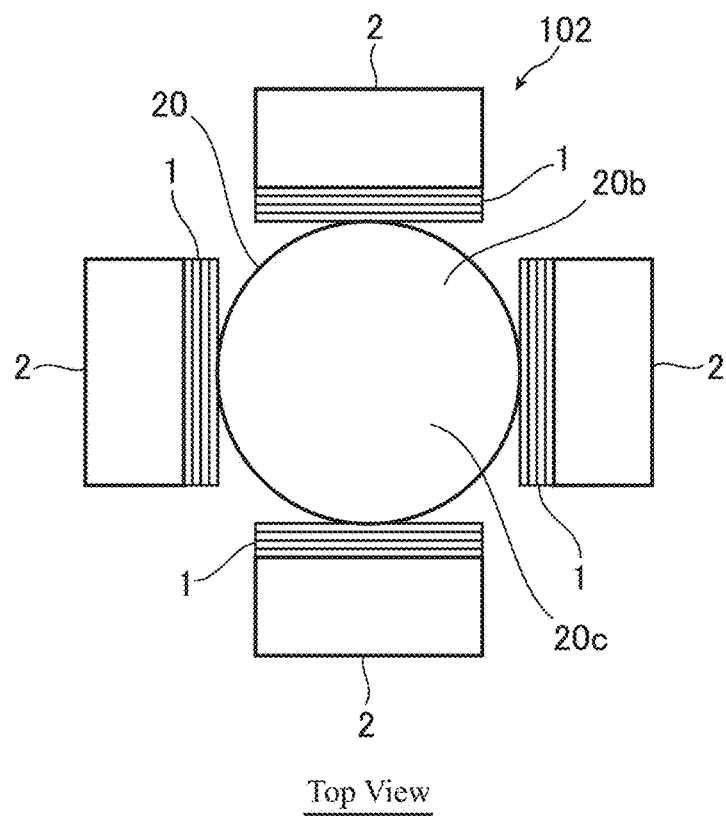
FIG. 6 is a top view and a side view showing the structure of an ultrasound probe according to a second variant of Embodiment 1.
Figure 6:
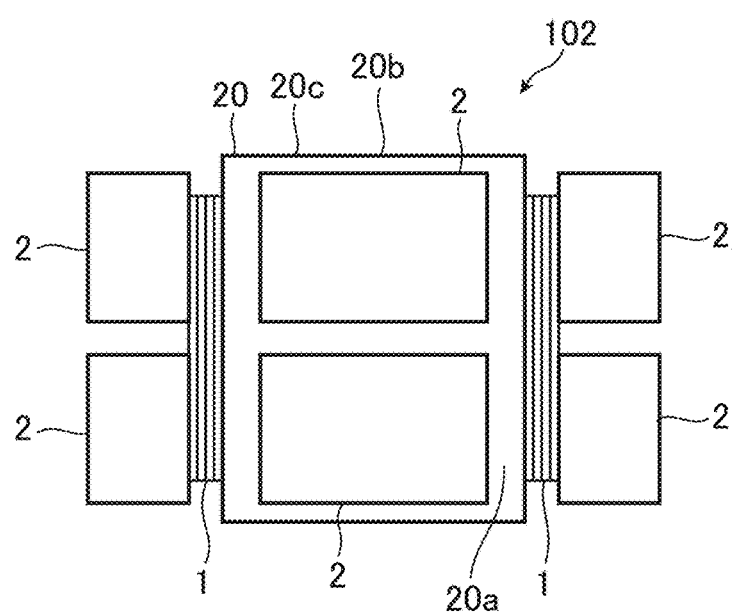

Next, a second variant of the ultrasound probe 100 will be explained by reference to a drawing. FIG. 6 is a top view and a side view showing the structure of an ultrasound probe 102 according to the second variant. As shown in FIG. 6, a metal case 20 has a cylindrical shape in which a side wall portion 20*a* is defined as a side face and a bottom wall portion 20*b* is defined as one bottom face.

Further, the ultrasound probe 102 includes multiple combinations each having a coil 1 and at least one or more magnets 2. Each of the multiple combinations is mounted on an outer surface of the side wall portion 20*a* in such a way that the combinations are arranged at positions which are mutually rotationally symmetric with respect to an axis passing through the center of the vibration surface 20*c* of the bottom wall portion 20*b* and being perpendicular to the vibration surface 20*c* of the bottom wall portion 20*b*.

In further detail, in this second variant, the ultrasound probe 102 includes, as the coil 1, four coils 1 each of which is mounted on the outer surface of the side wall portion 20*a*. Further, the ultrasound probe 102 includes, as the magnet 2, eight magnets 2 each of which is mounted in such a way as to sandwich a corresponding coil out of the four coils 1 between each of the magnets and the outer surface of the side wall portion 20*a*.

In this second variant, the example in which the number of combinations each having a coil 1 and at least one or more magnets 2 is four is explained. However, the number of combinations each having a coil 1 and at least one or more magnets 2 which the ultrasound probe 102 includes is not especially limited.

According to the structure of the second variant, a previously-mentioned Lorentz force occurring in the side wall portion 20*a* can be effectively propagated to the center of the vibration surface 20*c* of the bottom wall portion 20*b*.

As mentioned above, the ultrasound probe 100 according to Embodiment 1 is provided with: the metal case 3 including the bottom wall portion 3*b* having the vibration surface 3*c*, and the side wall portion 3*a* connected to the bottom wall portion 3*b*; the coil 1 mounted on one surface of the side wall portion 3*a*; and the magnet 2 mounted in such a way as to sandwich the coil 1 between the magnet and the one surface of the side wall portion 3*a*, and the coil 1 causes an eddy current to occur in the one surface of the side wall portion 3*a*, and then causes the bottom wall portion 3*b* to vibrate, by using a Lorentz force occurring in the side wall portion 3*a* because of the interaction between the eddy current and a magnetic field generated by the magnet 2.

According to the above-mentioned structure, because an ultrasonic wave having the same frequency as the frequency of the high-frequency current flowing through the coil 1 can be caused to occur in a test object, an ultrasonic wave of low frequency can be excited without upsizing the ultrasound probe, unlike in the case of previously-mentioned ultrasound probes using a piezoelectric element. More specifically, downsizing of the ultrasound probe 100 can be achieved. Further, because downsizing of the ultrasound probe 100 can be achieved, a weight reduction of the ultrasound probe 100 can also be achieved. Further, because a test object can be vibrated by way of the vibration surface 3c, unlike in the case of conventional EMATs, an ultrasonic nondestructive inspection can also be performed on a non-conductive test object.

Further, the coil 1 in the ultrasound probe 100 according to Embodiment 1 has the straight line portion 1c parallel to the vibration surface 3c of the bottom wall portion 3b, and the magnet 2 is mounted in such a way as to sandwich the straight line portion 1c of the coil 1 between the magnet and the one surface of the side wall portion 3a.

According to the above-mentioned structure, the direction of the Lorentz force 6 occurring in the side wall portion 3a can be caused to be perpendicular to the vibration surface 3c of the bottom wall portion 3b. As a result, a bending vibration can be caused to occur in the bottom wall portion 3b, and an ultrasonic wave can be excited in the test object by the bending vibration.

Further, the bottom wall portion 3b in the ultrasound probe 100 according to Embodiment 1 includes a single flat-shaped bottom wall portion.

According to the above-mentioned structure, the test object can be effectively vibrated by way of the vibration surface 3c of the flat-shaped bottom wall portion 3b.

Further, the side wall portion 3a in the ultrasound probe 100 according to Embodiment 1 includes the first flat-shaped side wall portion 3d and the second flat-shaped side wall portion 3e which face each other, the bottom wall portion 3b has a flat surface connected to ends of the respective first and second side wall portions 3d and 3e, the flat surface being opposite to the vibration surface, the first coil 1a mounted on a first surface of the first side wall portion 3d, the surface being opposite to a second surface, of the first side wall portion 3d, facing the second side wall portion 3e, and the second coil 1b mounted on a first surface of the second side wall portion 3e, the first surface being opposite to a second surface, of the second side wall portion 3e, facing the first side wall portion 3d, are provided as the coil 1, and at least one or more magnets 2 mounted in such a way as to sandwich the first coil 1a between the one or more magnets and the first surface of the first side wall portion 3d, the first surface being opposite to the second surface, of the first side wall portion 3d, facing the second side wall portion 3e, and at least one or more magnets 2 mounted in such a way as to sandwich the second coil 1b between the one or more magnets and the first surface of the second side wall portion 3e, the first surface being opposite to the second surface, of the second side wall portion 3e, facing the first side wall portion 3d, are provided as the magnet 2.

According to the above-mentioned structure, a Lorentz force occurring in the first side wall portion 3d and a Lorentz force occurring in the second side wall portion 3e can be effectively propagated to the vibration surface 3c of the bottom wall portion 3b.

Further, the metal case 10 in the ultrasound probe 101 according to Embodiment 1 has a polygonal prism shape in which the side wall portion 10a is defined as a side face and the bottom wall portion 10b is defined as one bottom face, and a number of combinations each having a coil 1 and at least one or more magnets 2, the number of combinations being equal to the number of multiple planes in the outer surface of the side wall portion 10a, are provided, and each of the combinations whose number is equal to the number of multiple planes is mounted on a corresponding plane out of the multiple planes in such a way that the combinations are arranged at positions which are mutually rotationally symmetric with respect to an axis passing through the center of the vibration surface 10c of the bottom wall portion 10b and being perpendicular to the vibration surface 10c of the bottom wall portion 10b.

According to the above-mentioned structure, a Lorentz force occurring in the side wall portion 10a can be effectively propagated to the center of the vibration surface 10c of the bottom wall portion 10b.

Further, the metal case 20 in the ultrasound probe 102 according to Embodiment 1 has a cylindrical shape in which the side wall portion 20a is defined as a side face and the bottom wall portion 20b is defined as one bottom face, and multiple combinations each having a coil 1 and at least one or more magnets 2 are provided, and each of the multiple combinations is mounted on the outer surface of the side wall portion 20a in such a way that the combinations are arranged at positions which are mutually rotationally symmetric with respect to an axis passing through the center of the vibration surface 20c of the outer bottom wall portion 20b and being perpendicular to the vibration surface 20c of the outer bottom wall portion 20b.

According to the above-mentioned structure, a Lorentz force occurring in the side wall portion 20a can be effectively propagated to the center of the vibration surface 20c of the bottom wall portion 20b.

Embodiment 2

In Embodiment 1, the structure in which the bottom wall portion 3b of the metal case 3 includes a single flat-shaped bottom wall portion is explained. In Embodiment 2, a structure in which a bottom wall portion includes an outer bottom wall portion, an inner bottom wall portion and a connection portion will be explained.

Hereinafter, Embodiment 2 will be explained by reference to drawings. Components having the same functions as those of components explained in Embodiment 1 are denoted by the same reference signs, and an explanation of the components will be omitted hereinafter.

Figure 7:
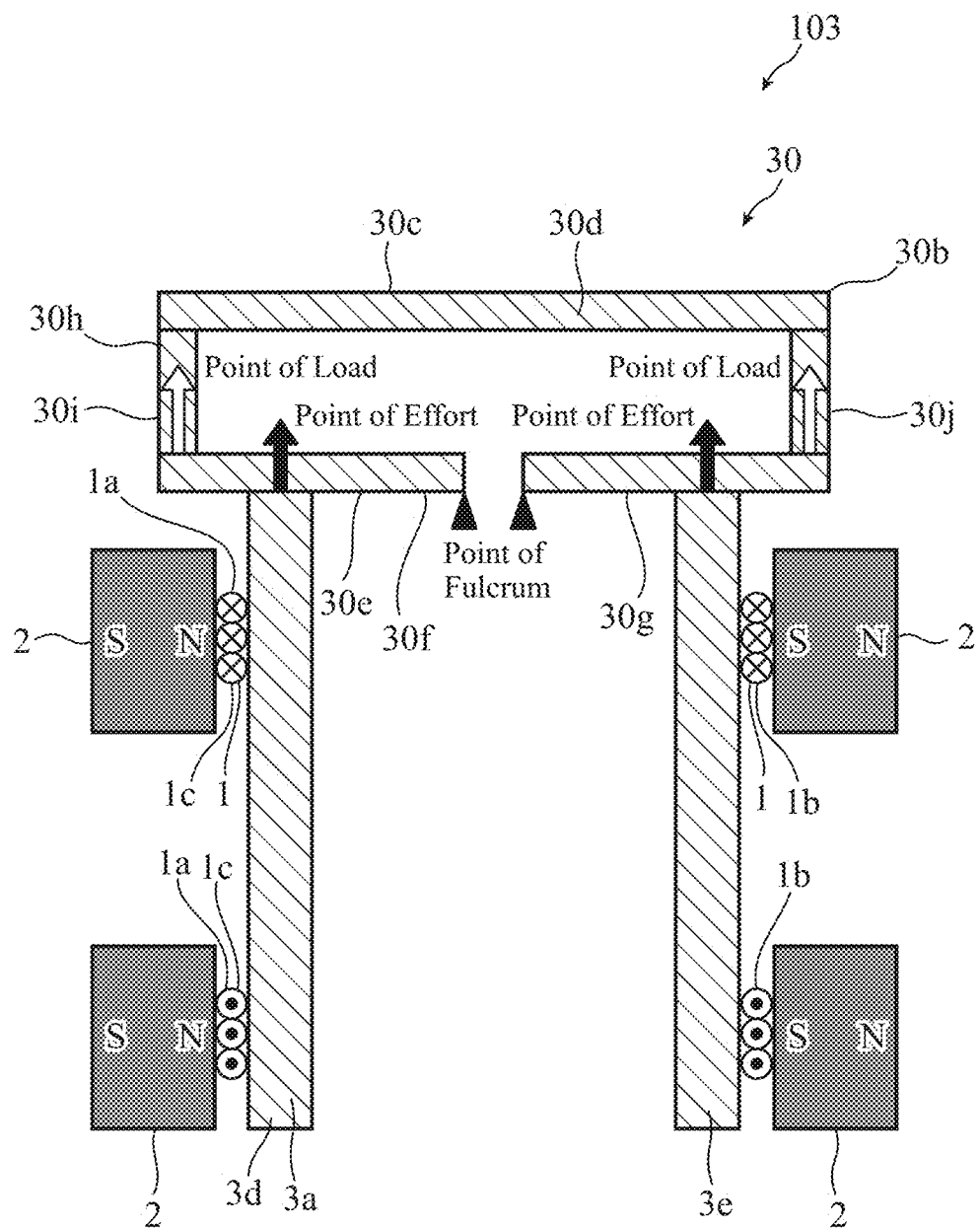
FIG. 7 is a cross-sectional view showing the structure of an ultrasound probe according to Embodiment 2.

FIG. 7 is a cross-sectional view showing the structure of an ultrasound probe 103 according to Embodiment 2. As shown in FIG. 7, in comparison with the ultrasound probe 100 according to Embodiment 1, the ultrasound probe 103 includes a metal case 30 having a bottom wall portion 30b instead of the bottom wall portion 3b.

The bottom wall portion 30b includes a flat-shaped outer bottom wall portion 30d having a vibration surface 30c, a flat-shaped inner bottom wall portion 30e whose one flat surface faces a flat surface of the outer bottom wall portion 30d, the flat surface of the outer bottom wall portion 30d being opposite to the vibration surface 30c, and a connection portion 30h that connects the outer bottom wall portion 30d and the inner bottom wall portion 30e. The inner bottom wall portion 30e has a first end and a second end opposite to the first end, the first end is fixed, the second end is connected to the connection portion 30h, and a portion between the first end and the second end is connected to an end of a side wall portion 3a.

The above description that "the first end is fixed" means that the first end is fixed in such a way as not to move. A method of fixing the first end in such a way that the first end does not move is not especially limited. For example, in a case where the ultrasound probe 103 is inserted into a housing which protects the ultrasound probe 103, the first end may be fixed by connecting the first end to the housing.

In further details about the metal case 30 shown in FIG. 7, in Embodiment 2, the side wall portion 3a includes a first flat-shaped side wall portion 3d and a second flat-shaped side wall portion 3e which face each other. The inner bottom wall portion 30e includes a first flat-shaped inner bottom wall portion 30f whose one flat surface faces a flat surface of the outer bottom wall portion 30d, the flat surface of the outer bottom wall portion 30d being opposite to the vibration surface 30c, and a second flat-shaped inner bottom wall portion 30g whose one flat surface faces the flat surface of the outer bottom wall portion 30d, the flat surface of the outer bottom wall portion 30d being opposite to the vibration surface 30c.

Further, in Embodiment 2, the connection portion 30h includes a first connection portion 30i that connects the first inner bottom wall portion 30f and the outer bottom wall portion 30d, and a second connection portion 30j that connects the second inner bottom wall portion 30g and the outer bottom wall portion 30d.

Further, in Embodiment 2, the first inner bottom wall portion 30f has a first end and a second end opposite to the first end, the first end is fixed, the second end is connected to the first connection portion 30i, and a portion between the first end and the second end is connected to an end of the first side wall portion 3d. In FIG. 7, the first end of the first inner bottom wall portion 30f faces a below-mentioned first end of the second inner bottom wall portion 30g. The second end of the first inner bottom wall portion 30f faces the outside of the metal case 30.

Further, in Embodiment 2, the second inner bottom wall portion 30g has the first end and a second end opposite to the first end, the first end is fixed, the second end is connected to the second connection portion 30j, and a portion between the first end and the second end is connected to an end of the second side wall portion 3e. In FIG. 7, the first end of the second inner bottom wall portion 30g faces the first end of the first inner bottom wall portion 30f. The second end of the second inner bottom wall portion 30g faces the outside of the metal case 30.

A coil 1 according to Embodiment 2 causes an eddy current to occur in one surface of the side wall portion 3a, and causes the outer bottom wall portion 30d to vibrate by way of the inner bottom wall portion 30e and the connection portion 30h, by using a Lorentz force occurring in the side wall portion 3a because of the interaction between the eddy current and a magnetic field generated by a magnet 2.

In further detail, the ultrasound probe 103 includes, as the coil 1, a first coil 1a mounted on a first surface of the first side wall portion 3d, the first surface being opposite to a second surface, of the first side wall portion 3d, facing the second side wall portion 3e, and a second coil 1b mounted on a first surface of the second side wall portion 3e, the first surface being opposite to a second surface, of the second side wall portion 3e, facing the first side wall portion 3d.

Further, the ultrasound probe 103 includes, as the magnet 2, at least one or more magnets 2 mounted in such a way as to sandwich the first coil 1a between the one or more magnets and the first surface of the first side wall portion 3d, the first surface being opposite to the second surface, of the first side wall portion 3d, facing the second side wall portion 3e, and at least one or more magnets 2 mounted in such a way as to sandwich the second coil 1b between the one or more magnets and the first surface of the second side wall portion 3e, the first surface being opposite to the second surface, of the second side wall portion 3e, facing the first side wall portion 3d.

Next, the operation of the ultrasound probe 103 according to Embodiment 2 will be explained. First, the coil 1 causes an eddy current to occur in the one surface of the side wall portion 3a, and causes the bottom wall portion 30b to vibrate by using a Lorentz force occurring in the side wall portion 3a because of the interaction between the eddy current and a magnetic field generated by the magnet 2. In further detail, for example, the first coil 1a causes an eddy current to occur in one surface of the first side wall portion 3d, and causes the first inner bottom wall portion 30f to vibrate by using a Lorentz force occurring in the first side wall portion 3d because of the interaction between the eddy current and a magnetic field generated by a magnet 2 shown in an upper left part of FIG. 7.

Because in the first inner bottom wall portion 30f a portion between the above-mentioned first and second ends is connected to an end of the first side wall portion 3d, the portion acts as the point of effort. Further, because in the first inner bottom wall portion 30f the first end is fixed, the first end acts as the point of fulcrum. Further, because in the first inner bottom wall portion 30f the second end is connected to the first connection portion 30i, the second end acts as the point of load.

More specifically, the first inner bottom wall portion 30f acts as a third class lever, and thus propagates a Lorentz force occurring in the first side wall portion 3d to the first connection portion 30i. As a result, in the outer bottom wall portion 30d connected to the first connection portion 30i, a vibration larger than that occurring in the bottom wall portion 3b according to Embodiment 1 occurs. The same goes for the second side wall portion 3e, the second inner bottom wall portion 30g and the second connection portion 30j. Therefore, the amplitude of an ultrasonic wave excited in a test object when the test object is brought into contact with the vibration surface 30c of the outer bottom wall portion 30d can be increased, and thus the sensitivity of an ultrasonic nondestructive inspection can be improved.

Figure 8:
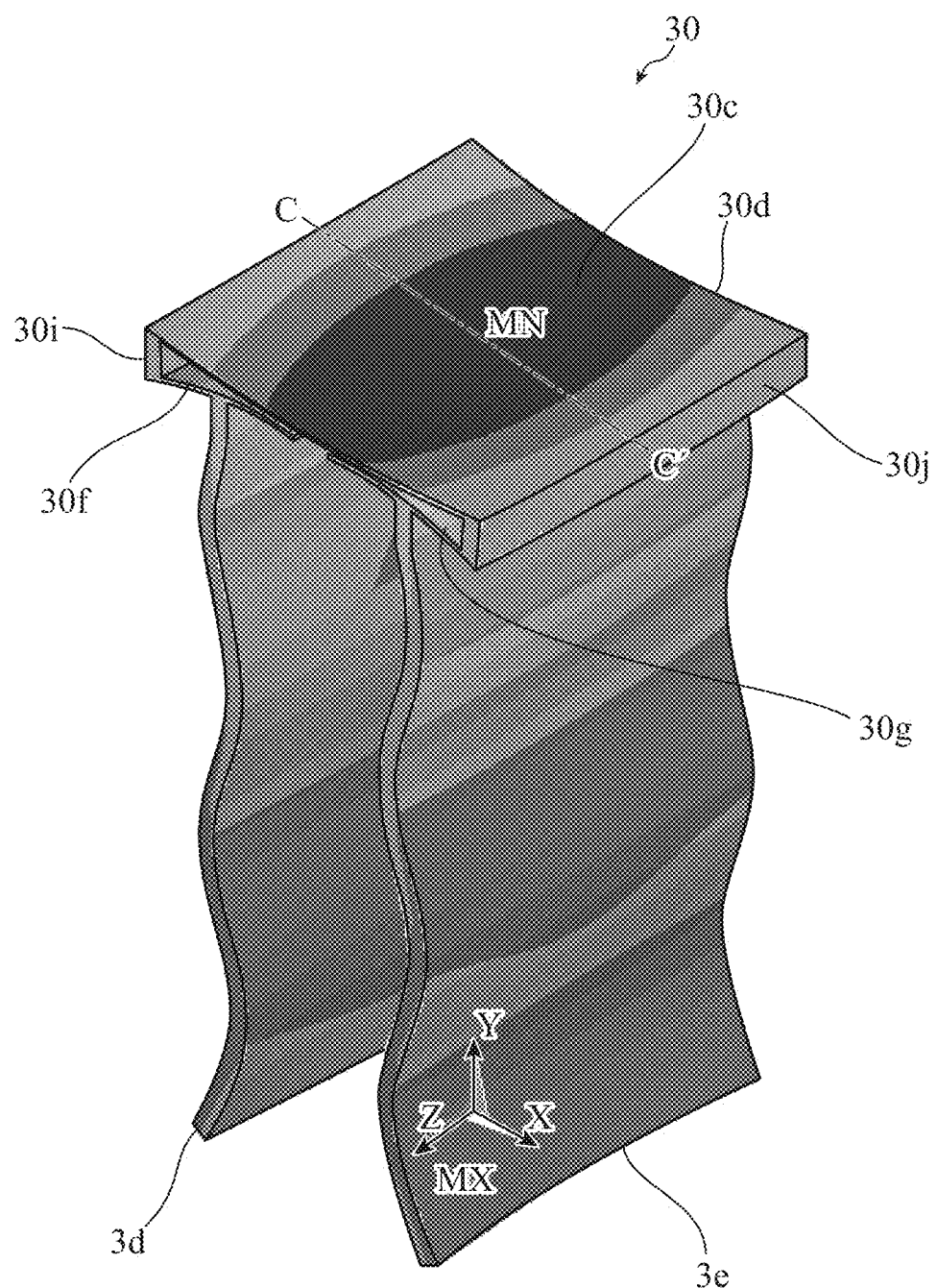
FIG. 8 is a view showing a result of determining the shape of a metal case according to Embodiment 2 after deformation when a stress caused by a Lorentz force is applied to a side wall portion of the metal case, by means of simulation.
Figure 9:
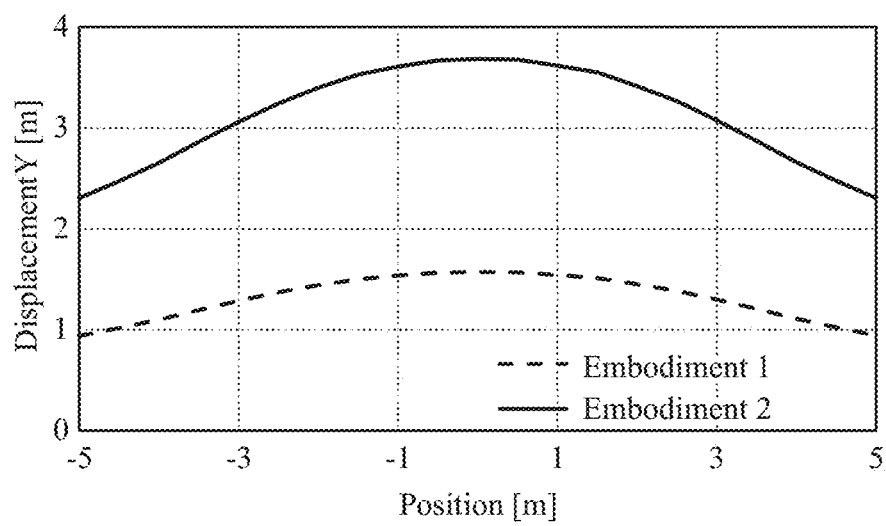
FIG. 9 is a graph showing a vibration displacement on a center line of a vibration surface of an outer bottom wall portion of the metal case according to Embodiment 2 and in a direction perpendicular to the vibration surface.

Next, a result of a simulation of the operation of the ultrasound probe 103 according to Embodiment 2 will be explained by reference to drawings. FIG. 8 is a view showing a result of determining the shape of the metal case 30 after deformation when stresses caused by Lorentz forces mentioned previously are applied to the first side wall portion 3d and the second side wall portion 3e of the metal case 30, by means of the simulation. FIG. 9 is a graph showing a vibration displacement on a center line of the vibration surface 30c of the outer bottom wall portion 30d and in a direction perpendicular to the vibration surface 30c. The center line of the vibration surface 30c is a dotted line CC' shown in FIG. 8. Further, the horizontal axis of the graph shown in FIG. 9 shows positions on the center line CC' in a case where the center of the vibration surface 30c is set as the point of origin, and the vertical axis of the graph shown in FIG. 9 shows the magnitude of the vibration displacement in the direction perpendicular to the vibration surface 30c. A solid line shown in FIG. 9 is a graph showing the vibration displacement on the center line of the vibration surface 30c of the outer bottom wall portion 30d and in the direction perpendicular to the vibration surface 30c. Further, in FIG. 9, a graph showing the vibration displacement on the center line of the vibration surface 3c of the bottom wall portion 3b according to Embodiment 1 and in the direction perpendicular to the vibration surface 3c is shown by a dotted line for comparison.

In the vibration surface 30c of FIG. 8, a dark portion compared with the surrounding area is a bending portion. Further, it is shown by the solid line of FIG. 9 that the vibration displacement becomes larger with increasing proximity to the center of the vibration surface 30c. More specifically, it can be recognized that the outer bottom wall portion 30d has a bending vibration. Further, the solid line of FIG. 9 shows the vibration displacement which is more than twice compared with the dotted line of FIG. 9 showing the vibration displacement in Embodiment 1, so that the above-mentioned advantageous effects provided by the ultrasound probe 103 according to Embodiment 2 can be recognized.

Figure 10:
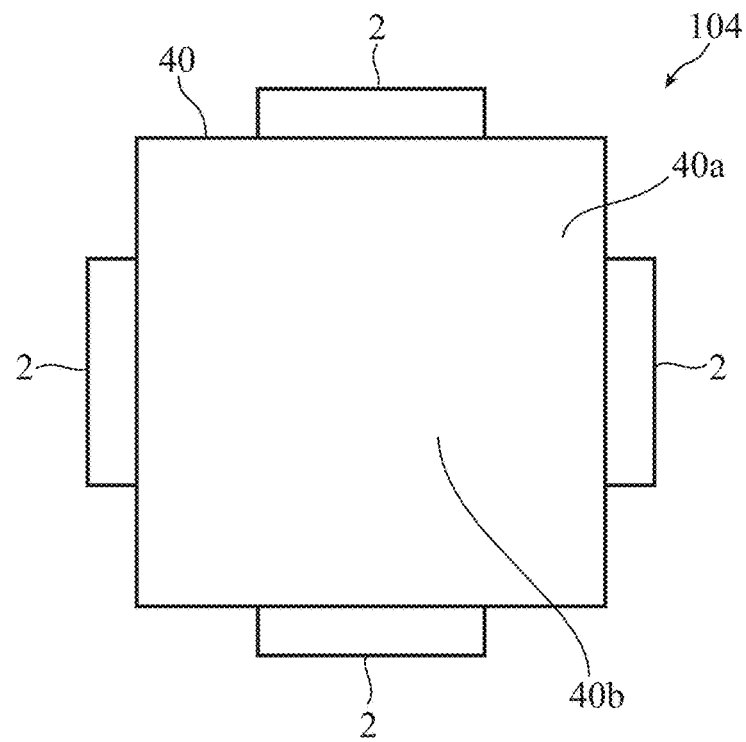
FIG. 10 is a top view and a side view showing the structure of an ultrasound probe according to a first variant of Embodiment 2.
Figure 10:
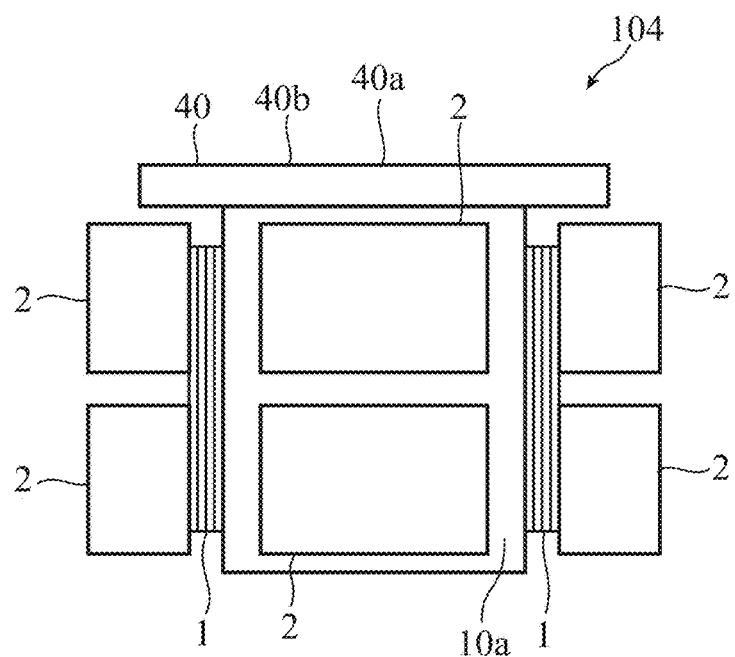

Next, a first variant of the ultrasound probe 103 will be explained by reference to a drawing. FIG. 10 is a top view and a side view showing the structure of an ultrasound probe 104 according to the first variant. As shown in FIG. 10, a metal case 40 has a polygonal prism shape in which a side wall portion 10a is defined as a side face. Further, a vibration surface 40b of an outer bottom wall portion 40a has a shape similar to that of a bottom face of the polygonal prism shape.

Although not illustrated, an inner bottom wall portion in the ultrasound probe 104 includes a single flat-shaped inner bottom wall portion having a penetrating hole in a central part thereof. In the single flat-shaped inner bottom wall portion, a previously-mentioned first end corresponds to an edge portion facing the penetrating hole, and a previously-mentioned second end corresponds to an outer edge portion located on a side opposite to the penetrating hole.

Further, the ultrasound probe 104 includes a number of combinations each having a coil 1 and at least one or more magnets 2, the number of combinations being equal to the number of multiple planes in an outer surface of the side wall portion 10a. Each of the multiple combinations whose number is equal to the number of multiple planes is mounted on a corresponding plane out of the multiple planes in such a way that the combinations are arranged at positions which are mutually rotationally symmetric with respect to an axis passing through the center of the vibration surface 40b of the outer bottom wall portion 40a and being perpendicular to the vibration surface 40b of the outer bottom wall portion 40a.

In further detail, in this first variant, the metal case 40 has a quadrangular prism shape in which the side wall portion 10a is defined as a side face. Further, the vibration surface 40b of the outer bottom wall portion 40a has a square shape similar to that of a bottom face of the quadrangular prism shape.

The ultrasound probe 104 includes, as the coil 1, four coils 1 each mounted on a corresponding plane out of four planes in the outer surface of the side wall portion 10a. Further, the ultrasound probe 104 includes, as the magnet 2, eight magnets 2 each mounted in such a way as to sandwich a corresponding coil out of the four coils 1 between each of the magnets and the corresponding plane out of the four planes in the outer surface of the side wall portion 10a.

In this first variant, the example in which the shape of the metal case 40 is a quadrangular prism one and the number of combinations each having a coil 1 and at least one or more magnets 2 is four is explained. However, the shape of the metal case 40 is not limited to this structure, and should just be a polygonal prism one. Further, the number of combinations each having a coil 1 and at least one or more magnets 2, the combinations being included in the ultrasound probe 104, is not especially limited.

According to the structure of the first variant, a previously-mentioned Lorentz force occurring in the side wall portion 10a can be effectively propagated to the center of the vibration surface 40b of the outer bottom wall portion 40a.

Figure 11:
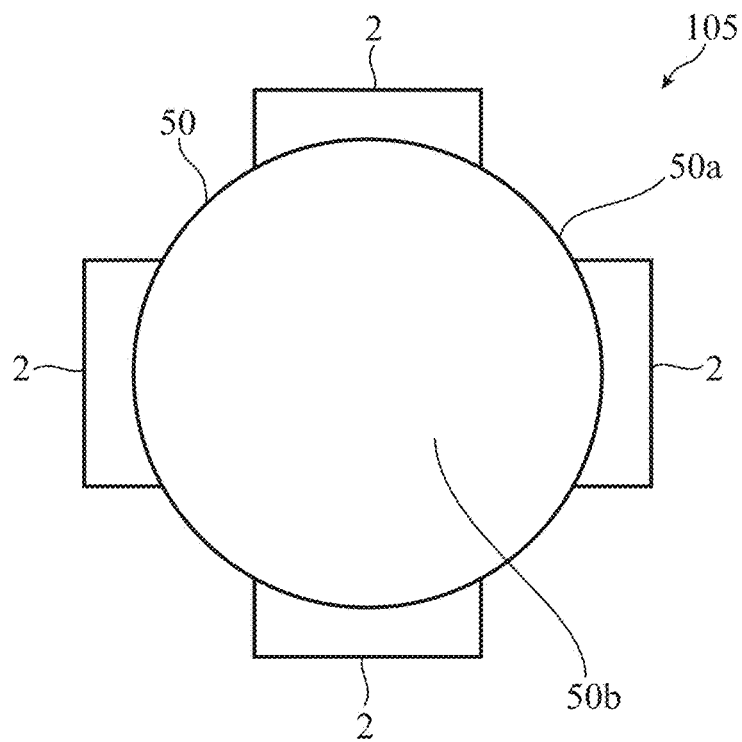
FIG. 11 is a top view and a side view showing the structure of an ultrasound probe according to a second variant of Embodiment 2.
Figure 11:
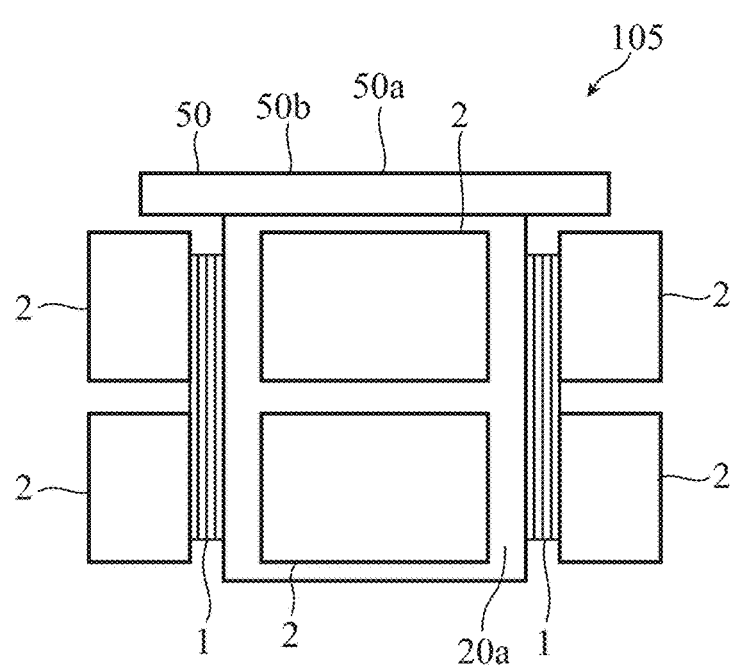

Next, a second variant of the ultrasound probe 103 will be explained by reference to a drawing. FIG. 11 is a top view and a side view showing the structure of an ultrasound probe 105 according to the second variant. As shown in FIG. 11, a metal case 50 has a cylindrical shape in which a side wall portion 20a is defined as a side face. A vibration surface 50b of an outer bottom wall portion 50a has a shape similar to that of a bottom face of the cylindrical shape.

Although not illustrated, an inner bottom wall portion in the ultrasound probe 105 includes a single flat-shaped inner bottom wall portion having a penetrating hole in a central part thereof. In the single flat-shaped inner bottom wall portion, a previously-mentioned first end corresponds to an edge portion facing the penetrating hole, and a previously-mentioned second end corresponds to an outer edge portion located on a side opposite to the penetrating hole.

Further, the ultrasound probe 105 includes multiple combinations each having a coil 1 and at least one or more magnets 2. Each of the multiple combinations is mounted on an outer surface of the side wall portion 20a in such a way that the combinations are arranged at positions which are mutually rotationally symmetric with respect to an axis passing through the center of the vibration surface 50b of the outer bottom wall portion 50a and being perpendicular to the vibration surface 50b of the outer bottom wall portion 50a.

In further detail, in this second variant, the ultrasound probe 105 includes, as the coil 1, four coils 1 each mounted on the outer surface of the side wall portion 20a. Further, the ultrasound probe 105 includes, as the magnet 2, eight magnets 2 each mounted in such a way as to sandwich a corresponding coil out of the four coils 1 between each of the magnets and the outer surface of the side wall portion 20a.

In this second variant, the example in which the number of combinations each having a coil 1 and at least one or more magnets 2 is four is explained. However, the number of combinations each having a coil 1 and at least one or more magnets 2, the combinations being included in the ultrasound probe 105, is not especially limited.

According to the structure of the second variant, a previously-mentioned Lorentz force occurring in the side wall portion 20a can be effectively propagated to the center of the vibration surface 50b of the outer bottom wall portion 50a.

As mentioned above, the bottom wall portion 30b in the ultrasound probe 103 according to Embodiment 2 includes the flat-shaped outer bottom wall portion 30d having the vibration surface 30c, the flat-shaped inner bottom wall portion 30e whose one flat surface faces a flat surface of the outer bottom wall portion 30d, the flat surface of the outer bottom wall portion 30d being opposite to the vibration surface 30c, and the connection portion 30h that connects the outer bottom wall portion 30d and the inner bottom wall portion 30e, the inner bottom wall portion 30e has a first end and a second end opposite to the first end, the first end is fixed, the second end is connected to the connection portion 30h, and a portion between the first end and the second end is connected to an end of the side wall portion 3a, and the coil 1 causes an eddy current to occur in one surface of the side wall portion 3a, and causes the outer bottom wall portion 30d to vibrate by way of the inner bottom wall portion 30e and the connection portion 30h, by using a Lorentz force occurring in the side wall portion 3a because of the interaction between the eddy current and a magnetic field generated by the magnet 2.

According to the above-mentioned structure, as mentioned above, the inner bottom wall portion 30e acts as a third class lever, and thus propagates the Lorentz force occurring in the side wall portion 3a to the connection portion 30h. As a result, in the outer bottom wall portion 30d connected to the first connection portion 30h, a vibration larger than that occurring in the bottom wall portion 3b according to Embodiment 1 occurs. Therefore, the amplitude of an ultrasonic wave excited in a test object when the test object is brought into contact with the vibration surface 30c of the outer bottom wall portion 30d can be increased, and thus the sensitivity of an ultrasonic nondestructive inspection can be improved.

Further, the side wall portion 3a in the ultrasound probe 103 according to Embodiment 2 includes the first flat-shaped side wall portion 3d and the second flat-shaped side wall portion 3e which face each other, the inner bottom wall portion 30e includes the first flat-shaped inner bottom wall portion 30f whose one flat surface faces a flat surface of the outer bottom wall portion 30d, the flat surface of the outer bottom wall portion 30d being opposite to the vibration surface 30c, and the second flat-shaped inner bottom wall portion 30g whose one flat surface faces the flat surface of the outer bottom wall portion 30d, the flat surface of the outer bottom wall portion 30d being opposite to the vibration surface 30c, the connection portion 30h includes the first connection portion 30i that connects the first inner bottom wall portion 30f and the outer bottom wall portion 30d, and the second connection portion 30j that connects the second inner bottom wall portion 30g and the outer bottom wall portion 30d, the first inner bottom wall portion 30f has a first end and a second end opposite to the first end, the first end is fixed, the second end is connected to the first connection portion 30i, and a portion between the first end and the second end is connected to an end of the first side wall portion 3d, the second inner bottom wall portion 30g has a first end and a second end opposite to the first end, the first end is fixed, the second end is connected to the second connection portion 30j, and a portion between the first end and the second end is connected to an end of the second side wall portion 3e, the first coil 1a mounted on a first surface of the first side wall portion 3d, the first surface being opposite to a second surface, of the first side wall portion 3d, facing the second side wall portion 3e, and the second coil 1b mounted on a first surface of the second side wall portion 3e, the first surface being opposite to a second surface, of the second side wall portion 3e, facing the first side wall portion 3d, are provided as the coil 1, and at least one or more magnets 2 mounted in such a way as to sandwich the first coil 1a between the one or more magnets and the first surface of the first side wall portion 3d, the first surface being opposite to the second surface, of the first side wall portion 3d, facing the second side wall portion 3e, and at least one or more magnets 2 mounted in such a way as to sandwich the second coil 1b between the one or more magnets and the first surface of the second side wall portion 3e, the first surface being opposite to the second surface, of the second side wall portion 3e, facing the first side wall portion 3d, are provided as the magnet 2.

According to the above-mentioned structure, a Lorentz force occurring in the first side wall portion 3d and a Lorentz force occurring in the second side wall portion 3e can be effectively propagated to the vibration surface 30c of the outer bottom wall portion 30d.

Further, the metal case 40 in the ultrasound probe 104 according to Embodiment 2 has a polygonal prism shape in which the side wall portion 10a is defined as a side face, the vibration surface 40b of the outer bottom wall portion 40a has a shape similar to that of a bottom face of the polygonal prism shape, and a number of combinations each having a coil 1 and at least one or more magnets 2, the number of combinations being equal to the number of multiple planes in the outer surface of the side wall portion 10a, are provided, and each of the combinations whose number is equal to the number of multiple planes is mounted on a corresponding plane out of the multiple planes in such a way that the combinations are arranged at positions which are mutually rotationally symmetric with respect to an axis passing through the center of the vibration surface 40b of the outer bottom wall portion 40a and being perpendicular to the vibration surface 40b of the outer bottom wall portion 40a.

According to the above-mentioned structure, a Lorentz force occurring in the side wall portion 10a can be effectively propagated to the center of the vibration surface 40b of the outer bottom wall portion 40a.

Further, the metal case 50 in the ultrasound probe 105 according to Embodiment 2 has a cylindrical shape in which the side wall portion 20a is defined as a side face, the vibration surface 50b of the outer bottom wall portion 50a has a shape similar to that of a bottom face of the cylindrical shape, and multiple combinations each having a coil 1 and at least one or more magnets 2 are provided, and each of the multiple combinations is mounted on the outer surface of the side wall portion 20a in such a way that the combinations are arranged at positions which are mutually rotationally symmetric with respect to an axis passing through the center of the vibration surface 50b of the outer bottom wall portion 50a and being perpendicular to the vibration surface 50b of the outer bottom wall portion 50a.

According to the above-mentioned structure, a Lorentz force occurring in the side wall portion 20a can be effectively propagated to the center of the vibration surface 50b of the outer bottom wall portion 50a.

Embodiment 3

In Embodiment 2, the structure in which in the inner bottom wall portion 30e, the first end is fixed, the second end is connected to the connection portion 30h, and a portion between the first end and the second end is connected to an end of the side wall portion 3a is explained. In Embodiment 3, a structure in which in an inner bottom wall portion, a first end is fixed, a second end is connected to an end of a side wall portion, and a portion between the first end and the second end is connected to a connection portion will be explained.

Hereinafter, Embodiment 3 will be explained by reference to drawings. Components having the same functions as those of components explained in Embodiment 1 or 2 are denoted by the same reference signs, and an explanation of the components will be omitted hereinafter.

Figure 12:
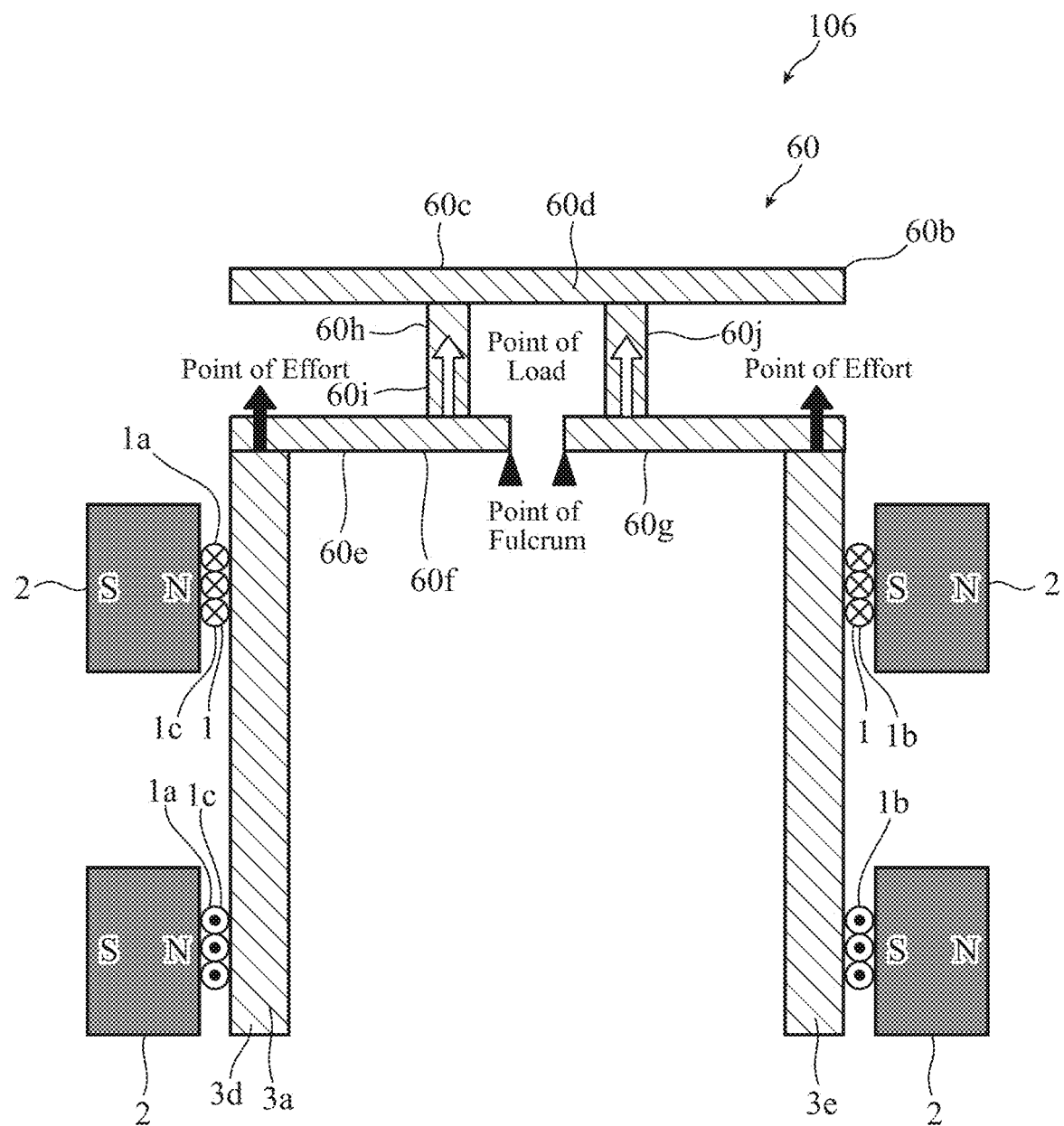
FIG. 12 is a cross-sectional view showing the structure of an ultrasound probe according to Embodiment 3.

FIG. 12 is a cross-sectional view showing the structure of an ultrasound probe 106 according to Embodiment 3. As shown in FIG. 12, in comparison with the ultrasound probe 103 according to Embodiment 2, a metal case 60 in the ultrasound probe 106 has a bottom wall portion 60b instead of the bottom wall portion 30b.

The bottom wall portion 60b includes a flat-shaped outer bottom wall portion 60d having a vibration surface 60c, a flat-shaped inner bottom wall portion 60e whose one flat surface faces a flat surface of the outer bottom wall portion 60d, the flat surface of the outer bottom wall portion 60d being opposite to the vibration surface 60c, and a connection portion 60h that connects the outer bottom wall portion 60d and the inner bottom wall portion 60e. The inner bottom wall portion 60e has a first end and a second end opposite to the first end, the first end is fixed, the second end is connected to an end of a side wall portion 3a, and a portion between the first end and the second end is connected to the connection portion 60h.

The above description that "the first end is fixed" means that the first end is fixed in such a way as not to move. A method of fixing the first end in such a way that the first end does not move is not especially limited. For example, in a case where the ultrasound probe 106 is inserted into a housing which protects the ultrasound probe 106, the first end may be fixed by connecting the first end to the housing.

In further details about the metal case 60 shown in FIG. 12, in Embodiment 3, the side wall portion 3a includes a first flat-shaped side wall portion 3d and a second flat-shaped side wall portion 3e which face each other, and the inner bottom wall portion 60e includes a first flat-shaped inner bottom wall portion 60f whose one flat surface faces a flat surface of the outer bottom wall portion 60d, the flat surface of the outer bottom wall portion 60d being opposite to the vibration surface 60c, and a second flat-shaped inner bottom wall portion 60g whose one flat surface faces the flat surface of the outer bottom wall portion 60d, the flat surface of the outer bottom wall portion 60d being opposite to the vibration surface 60c.

Further, in Embodiment 3, the connection portion 60h includes a first connection portion 60i that connects the first inner bottom wall portion 60f and the outer bottom wall portion 60d, and a second connection portion 60j that connects the second inner bottom wall portion 60g and the outer bottom wall portion 60d.

Further, in Embodiment 3, the first inner bottom wall portion 60f has a first end and a second end opposite to the first end, the first end is fixed, the second end is connected to an end of the first side wall portion 3d, and a portion between the first end and the second end is connected to the first connection portion 60i. In FIG. 12, the first end of the first inner bottom wall portion 60f faces a below-mentioned first end of the second inner bottom wall portion 60g. The second end of the first inner bottom wall portion 60f faces the outside of the metal case 60.

Further, in Embodiment 3, the second inner bottom wall portion 60g has the first end and a second end opposite to the first end, the first end is fixed, the second end is connected to an end of the second side wall portion 3e, and a portion between the first end and the second end is connected to the second connection portion 60j. In FIG. 12, the first end of the second inner bottom wall portion 60g faces the first end of the first inner bottom wall portion 60f. The second end of the second inner bottom wall portion 60g faces the outside of the metal case 60.

A coil 1 according to Embodiment 3 causes an eddy current to occur in one surface of the side wall portion 3a, and causes the outer bottom wall portion 60d to vibrate by way of the inner bottom wall portion 60e and the connection portion 60h, by using a Lorentz force occurring in the side wall portion 3a because of the interaction between the eddy current and a magnetic field generated by a magnet 2.

In further detail, the ultrasound probe 106 includes, as the coil 1, a first coil 1a mounted on a first surface of the first side wall portion 3d, the first surface being opposite to a second surface, of the first side wall portion 3d, facing the second side wall portion 3e, and a second coil 1b mounted on a first surface of the second side wall portion 3e, the first surface being opposite to a second surface, of the second side wall portion 3e, facing the first side wall portion 3d.

Further, the ultrasound probe 106 includes, as the magnet 2, at least one or more magnets 2 mounted in such a way as to sandwich the first coil 1a between the one or more magnets and the first surface of the first side wall portion 3d, the first surface being opposite to the second surface, of the first side wall portion 3d, facing the second side wall portion 3e, and at least one or more magnets 2 mounted in such a way as to sandwich the second coil 1b between the one or more magnets and the first surface of the second side wall portion 3e, the first surface being opposite to the second surface, of the second side wall portion 3e, facing the first side wall portion 3d.

Next, the operation of the ultrasound probe 106 according to Embodiment 3 will be explained. First, the coil 1 causes an eddy current to occur in the one surface of the side wall portion 3a, and causes the bottom wall portion 60b to vibrate by using a Lorentz force occurring in the side wall portion 3a because of the interaction between the eddy current and the magnetic field generated by the magnet 2. In further detail, for example, the first coil 1a causes an eddy current to occur in one surface of the first side wall portion 3d, and causes the first inner bottom wall portion 60f to vibrate by using a Lorentz force occurring in the first side wall portion 3d because of the interaction between the eddy current and a magnetic field generated by a magnet 2 shown in an upper left part of FIG. 12.

Because in the first inner bottom wall portion 60f the previously-mentioned second end is connected to an end of the first side wall portion 3d, the second end acts as the point of effort. Further, because in the first inner bottom wall portion 60f the previously-mentioned first end is fixed, the first end acts as the point of fulcrum. Further, because in the first inner bottom wall portion 60f a portion between the first and second ends is connected to the first connection portion 60i, the portion acts as the point of load.

More specifically, the first inner bottom wall portion 60f acts as a second class lever, and thus propagates a Lorentz force occurring in the first side wall portion 3d to the first connection portion 60i. As a result, in the outer bottom wall portion 60d connected to the first connection portion 60i, a vibration larger than that occurring in the bottom wall portion 3b according to Embodiment 1 occurs. The same goes for the second side wall portion 3e, the second inner bottom wall portion 60g and the second connection portion 60j. Therefore, the amplitude of an ultrasonic wave excited in a test object when the test object is brought into contact with the vibration surface 60c of the outer bottom wall portion 60d can be increased, and thus the sensitivity of an ultrasonic nondestructive inspection can be improved.

Figure 13:
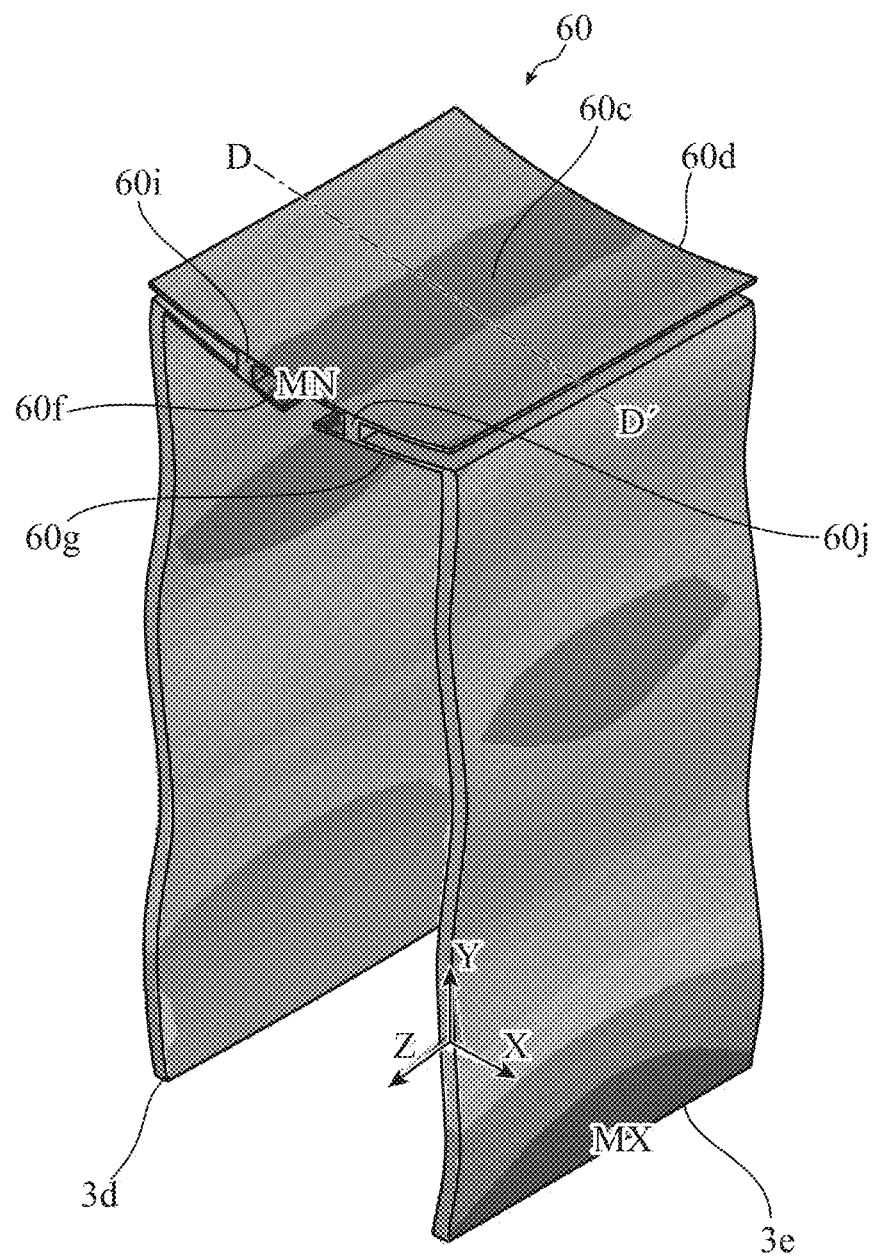
FIG. 13 is a view showing a result of determining the shape of a metal case according to Embodiment 3 after deformation when a stress caused by a Lorentz force is applied to a side wall portion of the metal case, by means of simulation.
Figure 14:
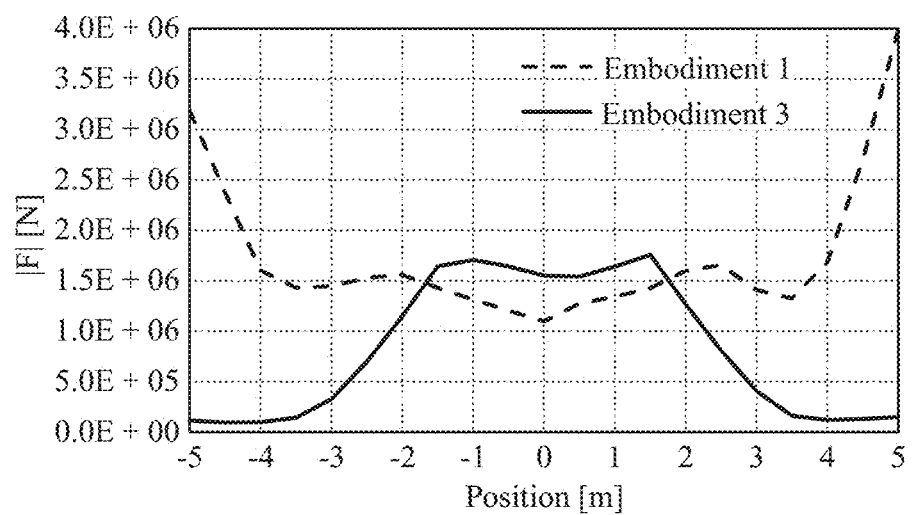
FIG. 14 is a graph showing a stress on a center line of a vibration surface of an outer bottom wall portion of the metal case according to Embodiment 3, the stress being on the vibration surface.

Next, a result of a simulation of the operation of the ultrasound probe 106 according to Embodiment 3 will be explained by reference to drawings. FIG. 13 is a view showing a result of determining the shape of the metal case 60 after deformation when stresses caused by Lorentz forces mentioned previously are applied to the first side wall portion 3d and the second side wall portion 3e of the metal case 60, by means of the simulation. FIG. 14 is a graph showing a stress on the outer bottom wall portion 60d, the stress being on a center line of the vibration surface 60c of the outer bottom wall portion 60d. The center line of the vibration surface 60c is a dotted line DD' shown in FIG. 13. Further, the horizontal axis of the graph shown in FIG. 14 shows positions on the center line DD' in a case where the center of the vibration surface 60c is set as the point of origin, and the vertical axis of the graph shown in FIG. 14 shows the magnitude of a stress on the outer bottom wall portion 60d. A solid line shown in FIG. 14 is a graph showing the stress on the outer bottom wall portion 60d, the stress being on the center line of the vibration surface 60c of the outer bottom wall portion 60d. Further, in FIG. 14, a graph showing the stress on the bottom wall portion 3b, the stress being on the center line of the vibration surface 3c of the bottom wall portion 3b according to Embodiment 1, is shown by a dotted line for comparison.

In the vibration surface 60c of FIG. 13, a dark portion compared with the surrounding area is a bending portion.

Further, it can be recognized from the comparison between the solid and dotted lines in FIG. 14 that the stress on the outer bottom wall portion 60d in the center and its vicinity (±1.5 mm) of the vibration surface 60c is larger than that on the bottom wall portion 3b according to Embodiment 1, and thus the vibration is centralized to the center and its vicinity of the vibration surface 60c. More specifically, the previously-mentioned advantageous effects provided by the ultrasound probe 106 according to Embodiment 3 can be recognized.

Figure 15:
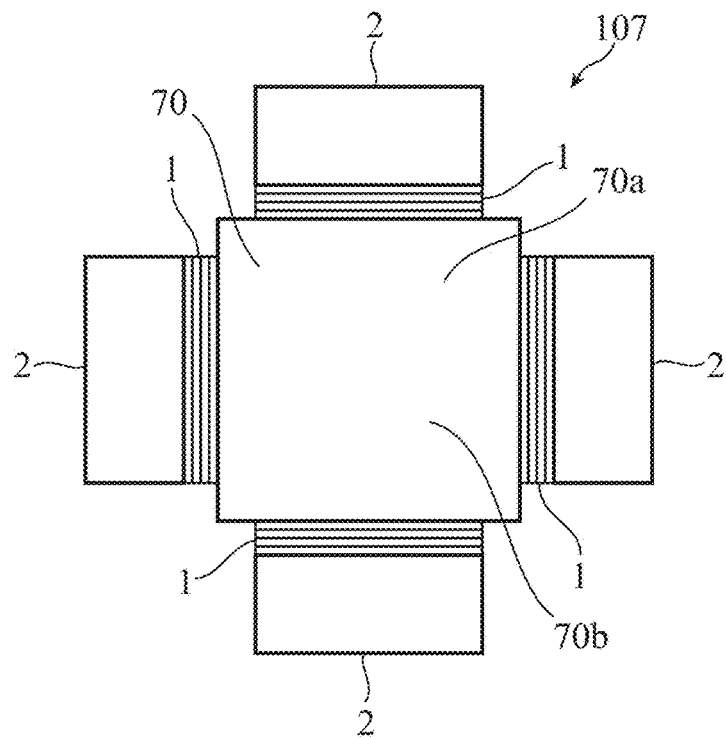
FIG. 15 is a top view and a side view showing the structure of an ultrasound probe according to a first variant of Embodiment 3.
Figure 15:
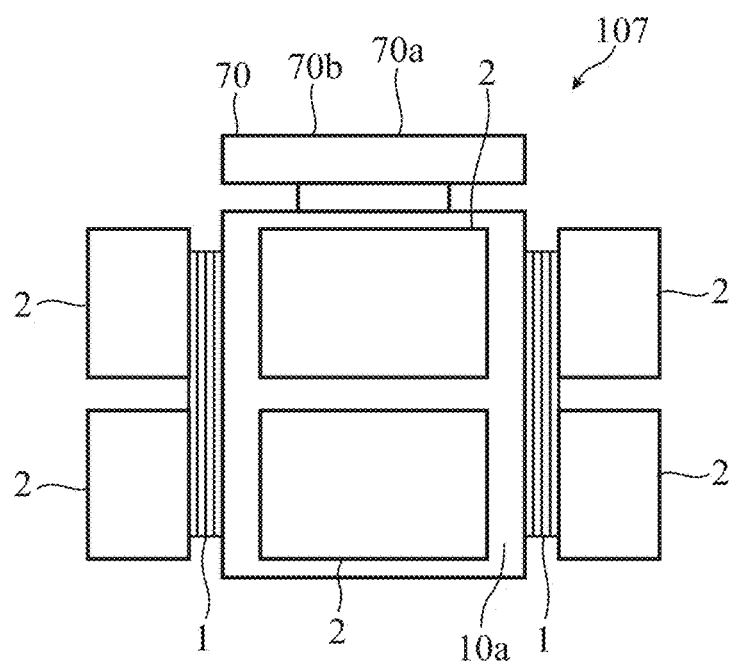

Next, a first variant of the ultrasound probe 106 will be explained by reference to a drawing. FIG. 15 is a top view and a side view showing the structure of an ultrasound probe 107 according to the first variant. As shown in FIG. 15, a metal case 70 has a polygonal prism shape in which a side wall portion 10a is defined as a side face. Further, a vibration surface 70b of an outer bottom wall portion 70a has a shape similar to that of a bottom face of the polygonal prism shape.

Although not illustrated, an inner bottom wall portion in the ultrasound probe 107 includes a single flat-shaped inner bottom wall portion having a penetrating hole in a central part thereof. In the single flat-shaped inner bottom wall portion, a previously-mentioned first end corresponds to an edge portion facing the penetrating hole, and a previously-mentioned second end corresponds to an outer edge portion located on a side opposite to the penetrating hole.

Further, the ultrasound probe 107 includes a number of combinations each having a coil 1 and at least one or more magnets 2, the number of combinations being equal to the number of multiple planes in an outer surface of the side wall portion 10a. Each of the multiple combinations whose number is equal to the number of multiple planes is mounted on a corresponding plane out of the multiple planes in such a way that the combinations are arranged at positions which are mutually rotationally symmetric with respect to an axis passing through the center of the vibration surface 70b of the outer bottom wall portion 70a and being perpendicular to the vibration surface 70b of the outer bottom wall portion 70a.

In further detail, in this first variant, the metal case 70 has a quadrangular prism shape in which the side wall portion 10a is defined as a side face. Further, the vibration surface 70b of the outer bottom wall portion 70a has a square shape similar to that of a bottom face of the quadrangular prism shape.

The ultrasound probe 107 includes, as the coil 1, four coils 1 each mounted on a corresponding plane out of four planes in the outer surface of the side wall portion 10a. Further, the ultrasound probe 107 includes, as the magnet 2, eight magnets 2 each mounted in such a way as to sandwich a corresponding coil out of the four coils 1 between each of the magnets and the corresponding plane out of the four planes in the outer surface of the side wall portion 10a.

In this first variant, the example in which the shape of the metal case 70 is a quadrangular prism one and the number of combinations each having a coil 1 and at least one or more magnets 2 is four is explained. However, the shape of the metal case 70 is not limited to this structure, and should just be a polygonal prism one. Further, the number of combinations each having a coil 1 and at least one or more magnets 2, the combinations being included in the ultrasound probe 107, is not especially limited.

According to the structure of the first variant, a previously-mentioned Lorentz force occurring in the side wall portion 10a can be effectively propagated to the center of the vibration surface 70b of the outer bottom wall portion 70a.

Figure 16:
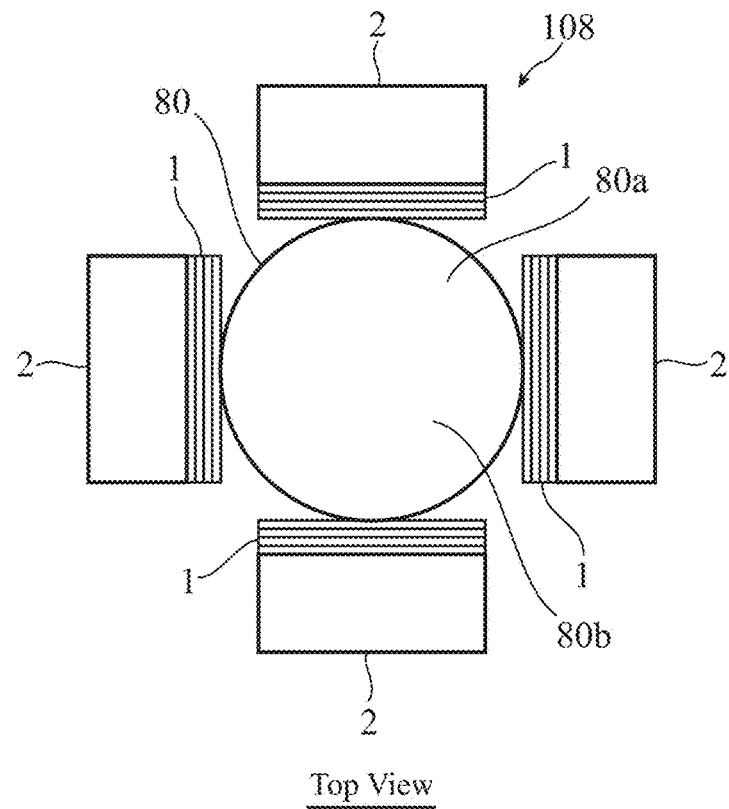
FIG. 16 is a top view and a side view showing the structure of an ultrasound probe according to a second variant of Embodiment 3.
Figure 16:
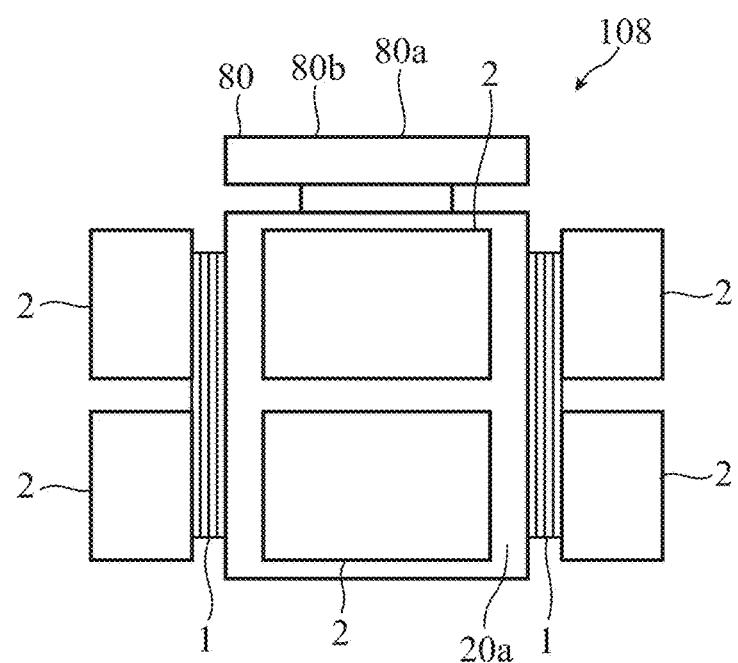

Next, a second variant of the ultrasound probe 106 will be explained by reference to a drawing. FIG. 16 is a top view and a side view showing the structure of an ultrasound probe 108 according to the second variant. As shown in FIG. 16, a metal case 80 has a cylindrical shape in which a side wall portion 20a is defined as a side face. A vibration surface 80b of an outer bottom wall portion 80a has a shape similar to that of a bottom face of the cylindrical shape.

Although not illustrated, an inner bottom wall portion in the ultrasound probe 108 includes a single flat-shaped inner bottom wall portion having a penetrating hole in a central part thereof. In the single flat-shaped inner bottom wall portion, a previously-mentioned first end corresponds to an edge portion facing the penetrating hole, and a previously-mentioned second end corresponds to an outer edge portion located on a side opposite to the penetrating hole.

Further, the ultrasound probe 108 includes multiple combinations each having a coil 1 and at least one or more magnets 2. Each of the multiple combinations is mounted on an outer surface of the side wall portion 20a in such a way that the combinations are arranged at positions which are mutually rotationally symmetric with respect to an axis passing through the center of the vibration surface 80b of the outer bottom wall portion 80a and being perpendicular to the vibration surface 80b of the outer bottom wall portion 80a.

In further detail, in this second variant, the ultrasound probe 108 includes, as the coil 1, four coils 1 each mounted on an outer surface of the side wall portion 20a. Further, the ultrasound probe 108 includes, as the magnet 2, eight magnets 2 each mounted in such a way as to sandwich a corresponding coil out of the four coils 1 between each of the magnets and the outer surface of the side wall portion 20a.

In this second variant, the example in which the number of combinations each having a coil 1 and at least one or more magnets 2 is four is explained. However, the number of combinations each having a coil 1 and at least one or more magnets 2, the combinations being included in the ultrasound probe 108, is not especially limited.

According to the structure of the second variant, a previously-mentioned Lorentz force occurring in the side wall portion 20a can be effectively propagated to the center of the vibration surface 80b of the outer bottom wall portion 80a.

As mentioned above, the bottom wall portion 60b in the ultrasound probe 106 according to Embodiment 3 includes the flat-shaped outer bottom wall portion 60d having the vibration surface 60c, the flat-shaped inner bottom wall portion 60e whose one flat surface faces a flat surface of the outer bottom wall portion 60d, the flat surface of the outer bottom wall portion 60d being opposite to the vibration surface 60c, and the connection portion 60h that connects the outer bottom wall portion 60d and the inner bottom wall portion 60e, the inner bottom wall portion 60e has a first end and a second end opposite to the first end, the first end is fixed, the second end is connected to an end of the side wall portion 3a, and a portion between the first end and the second end is connected to the connection portion 60h, and the coil 1 causes an eddy current to occur in the one surface of the side wall portion 3a, and causes the outer bottom wall portion 60d to vibrate by way of the inner bottom wall portion 60e and the connection portion 60h, by using a Lorentz force occurring in the side wall portion 3a because of the interaction between the eddy current and a magnetic field generated by the magnet 2.

According to the above-mentioned structure, the inner bottom wall portion 60e acts as a second class lever, and thus propagates the Lorentz force occurring in the side wall portion 3a to the connection portion 60h, as mentioned above. As a result, in the outer bottom wall portion 60d connected to the connection portion 60h, a vibration larger than that occurring in the bottom wall portion 3b according to Embodiment 1 occurs. Therefore, the amplitude of an ultrasonic wave excited in a test object when the test object is brought into contact with the vibration surface 60c of the outer bottom wall portion 60d can be increased, and thus the sensitivity of an ultrasonic nondestructive inspection can be improved.

Further, the side wall portion 3a in the ultrasound probe 106 according to Embodiment 3 includes the first flat-shaped side wall portion 3d and the second flat-shaped side wall portion 3e which face each other, the inner bottom wall portion 60e includes the first flat-shaped inner bottom wall portion 60f whose one flat surface faces a flat surface of the outer bottom wall portion 60d, the flat surface of the outer bottom wall portion 60d being opposite to the vibration surface 60c, and the second flat-shaped inner bottom wall portion 60g whose one flat surface faces the flat surface of the outer bottom wall portion 60d, the flat surface of the outer bottom wall portion 60d being opposite to the vibration surface 60c, the connection portion 60h includes the first connection portion 60i that connects the first inner bottom wall portion 60f and the outer bottom wall portion 60d and the second connection portion 60j that connects the second inner bottom wall portion 60g and the outer bottom wall portion 60d, the first inner bottom wall portion 60f has a first end and a second end opposite to the first end, the first end is fixed, the second end is connected to an end of the first side wall portion 3d, and a portion between the first end and the second end is connected to the first connection portion 60i, the second inner bottom wall portion 60g has a first end and a second end opposite to the first end, the first end is fixed, the second end is connected to an end of the second side wall portion 3e, and a portion between the first end and the second end is connected to the second connection portion 60j, the first coil 1a mounted on a first surface of the first side wall portion 3d, the first surface being opposite to a second surface, of the first side wall portion 3d, facing the second side wall portion 3e, and the second coil 1b mounted on a first surface of the second side wall portion 3e, the first surface being opposite to a second surface, of the second side wall portion 3e, facing the first side wall portion 3d, are provided as the coil 1, and at least one or more magnets 2 mounted in such a way as to sandwich the first coil 1a between the one or more magnets and the first surface of the first side wall portion 3d, the first surface being opposite to the second surface, of the first side wall portion 3d, facing the second side wall portion 3e, and at least one or more magnets 2 mounted in such a way as to sandwich the second coil 1b between the one or more magnets and the first surface of the second side wall portion 3e, the first surface being opposite to the second surface, of the side wall portion 3e, facing the first side wall portion 3d, are provided as the magnet 2.

According to the above-mentioned structure, a Lorentz force occurring in the first side wall portion 3d and a Lorentz force occurring in the second side wall portion 3e can be effectively propagated to the vibration surface 60c of the outer bottom wall portion 60d.

Further, the metal case 70 in the ultrasound probe 107 according to Embodiment 3 has a polygonal prism shape in which the side wall portion 10a is defined as a side face, the vibration surface 70b of the outer bottom wall portion 70a has a shape similar to that of a bottom face of the polygonal prism shape, and a number of combinations each having a coil 1 and at least one or more magnets 2, the number of combinations being equal to the number of multiple planes in the outer surface of the side wall portion 10a, are provided, and each of the combinations whose number is equal to the number of multiple planes is mounted on a corresponding plane out of the multiple planes in such a way that the combinations are arranged at positions which are mutually rotationally symmetric with respect to an axis passing through the center of the vibration surface 70b of the outer bottom wall portion 70a and being perpendicular to the vibration surface 70b of the outer bottom wall portion 70a.

According to the above-mentioned structure, a Lorentz force occurring in the side wall portion 10a can be effectively propagated to the center of the vibration surface 70b of the outer bottom wall portion 70a.

Further, the metal case 80 in the ultrasound probe 108 according to Embodiment 3 has a cylindrical shape in which the side wall portion 20a is defined as a side face, the vibration surface 80b of the outer bottom wall portion 80a has a shape similar to that of a bottom face of the cylindrical shape, and multiple combinations each having a coil 1 and at least one or more magnets 2 are provided, and each of the multiple combinations is mounted on the outer surface of the side wall portion 20a in such a way that the combinations are arranged at positions which are mutually rotationally symmetric with respect to an axis passing through the center of the vibration surface 80b of the outer bottom wall portion 80a and being perpendicular to the vibration surface 80b of the outer bottom wall portion 80a.

According to the above-mentioned structure, a Lorentz force occurring in the side wall portion 20a can be effectively propagated to the center of the vibration surface 80b of the outer bottom wall portion 80a.

It is to be understood that any combination of two or more of the above-mentioned embodiments can be made, various changes can be made in any component according to any one of the above-mentioned embodiments, or any component according to any one of the above-mentioned embodiments can be omitted within the scope of the present invention.

INDUSTRIAL APPLICABILITY

Because the ultrasound probe according to the present invention can achieve downsizing thereof and can perform an ultrasonic nondestructive inspection on a non-conductive test object, the ultrasound probe according to the present invention can be used for ultrasonic nondestructive inspections.

REFERENCE SIGNS LIST 1 coil, 1a first coil, 1b second coil, 1c straight line portion, 2 magnet, 3 metal case, 3a side wall portion, 3b bottom wall portion, 3c vibration surface, 3d first side wall portion, 3e second side wall portion, 4 eddy current, 5 static magnetic field, 6 Lorentz force, 10 metal case, 10a side wall portion, 10b bottom wall portion, 10c vibration surface, 20 metal case, 20a side wall portion, 20b bottom wall portion, 20c vibration surface, 30 metal case, 30b bottom wall portion, 30c vibration surface, 30d outer bottom wall portion, 30e inner bottom wall portion, 30f first inner bottom wall portion, 30g second inner bottom wall portion, 30h connection portion, 30i first connection portion, 30j second connection portion, 40 metal case, 40a outer bottom wall portion, 40b vibration surface, 50 metal case, 50a outer bottom wall portion, 50b vibration surface, 60 metal case, 60b bottom wall portion, 60c vibration surface, 60d outer bottom wall portion, 60e inner bottom wall portion, 60f first inner bottom wall portion, 60g second inner bottom wall portion, 60h connection portion, 60*i* first connection portion, 60*j* second connection portion, 70 metal case, 70*a* outer bottom wall portion, 70*b* vibration surface, 80 metal case, 80*a* outer bottom wall portion, 80*b* vibration surface, and 100, 101, 102, 103, 104, 105, 106, 107, 108 ultrasound probe.

The invention claimed is:

1. An ultrasound probe comprising:
a metal case including a bottom wall portion having a vibration surface, and a side wall portion connected to the bottom wall portion;
a coil mounted on one surface of the side wall portion; and
a magnet mounted in such a way as to sandwich the coil between the magnet and the one surface of the side wall portion,
wherein the coil causes an eddy current to occur in the one surface of the side wall portion, and causes the bottom wall portion to vibrate, by using a Lorentz force occurring in the side wall portion because of an interaction between the eddy current and a magnetic field generated by the magnet, and
wherein the bottom wall portion includes a flat-shaped outer bottom wall portion having the vibration surface, a flat-shaped inner bottom wall portion whose one flat surface faces a flat surface of the outer bottom wall portion, the flat surface of the outer bottom wall portion being opposite to the vibration surface, and a connection portion that connects the outer bottom wall portion and the inner bottom wall portion.

2. The ultrasound probe according to claim 1, wherein the coil has a straight line portion parallel to the vibration surface of the bottom wall portion, and the magnet is mounted in such a way as to sandwich the straight line portion of the coil between the magnet and the one surface of the side wall portion.

3. The ultrasound probe according to claim 1, wherein
the inner bottom wall portion has a first end and a second end opposite to the first end, the first end is fixed, the second end is connected to the connection portion, and a portion between the first end and the second end is connected to an end of the side wall portion, and wherein
the coil causes the eddy current to occur in the one surface of the side wall portion, and causes the outer bottom wall portion to vibrate by way of the inner bottom wall portion and the connection portion, by using the Lorentz force occurring in the side wall portion because of the interaction between the eddy current and the magnetic field generated by the magnet.

4. The ultrasound probe according to claim 3, wherein the side wall portion includes a first flat-shaped side wall portion and a second flat-shaped side wall portion which face each other,
the inner bottom wall portion includes a first flat-shaped inner bottom wall portion whose one flat surface faces a flat surface of the outer bottom wall portion, the flat surface of the outer bottom wall portion being opposite to the vibration surface, and a second flat-shaped inner bottom wall portion whose one flat surface faces the flat surface of the outer bottom wall portion, the flat surface of the outer bottom wall portion being opposite to the vibration surface,
the connection portion includes a first connection portion that connects the first inner bottom wall portion and the outer bottom wall portion, and a second connection portion that connects the second inner bottom wall portion and the outer bottom wall portion,
the first inner bottom wall portion has a first end and a second end opposite to the first end, the first end is fixed, the second end is connected to the first connection portion, and a portion between the first end and the second end is connected to an end of the first side wall portion, and
the second inner bottom wall portion has a first end and a second end opposite to the first end, the first end is fixed, the second end is connected to the second connection portion, and a portion between the first end and the second end is connected to an end of the second side wall portion, and wherein
the ultrasound probe includes, as the coil, a first coil mounted on a first surface of the first side wall portion, the first surface being opposite to a second surface, of the first side wall portion, facing the second side wall portion, and a second coil mounted on a first surface of the second side wall portion, the first surface being opposite to a second surface, of the second side wall portion, facing the first side wall portion, and
the ultrasound probe includes, as the magnet, at least one or more magnets mounted in such a way as to sandwich the first coil between the one or more magnets and the first surface of the first side wall portion, the first surface being opposite to the second surface, of the first side wall portion, facing the second side wall portion, and at least one or more magnets mounted in such a way as to sandwich the second coil between the one or more magnets and the first surface of the second side wall portion, the first surface being opposite to the second surface, of the second side wall portion, facing the first side wall portion.

5. The ultrasound probe according to claim 3, wherein the metal case has a polygonal prism shape in which the side wall portion is defined as a side face,
the vibration surface of the outer bottom wall portion has a shape similar to that of a bottom face of the polygonal prism shape, and
the ultrasound probe includes a number of combinations each having the coil and at least one or more of the magnets, the number of combinations being equal to the number of multiple planes in an outer surface of the side wall portion, and wherein
each of the combinations whose number is equal to the number of multiple planes is mounted on a corresponding plane out of the multiple planes in such a way that the combinations are arranged at positions which are mutually rotationally symmetric with respect to an axis passing through a center of the vibration surface of the outer bottom wall portion and being perpendicular to the vibration surface of the outer bottom wall portion.

6. The ultrasound probe according to claim 3, wherein the metal case has a cylindrical shape in which the side wall portion is defined as a side face,
the vibration surface of the outer bottom wall portion has a shape similar to that of a bottom face of the cylindrical shape, and
the ultrasound probe includes multiple combinations each having the coil and at least one or more of the magnets, and wherein
each of the multiple combinations is mounted on an outer surface of the side wall portion in such a way that the combinations are arranged at positions which are mutually rotationally symmetric with respect to an axis passing through a center of the vibration surface of the outer bottom wall portion and being perpendicular to the vibration surface of the outer bottom wall portion.

7. The ultrasound probe according to claim 1, wherein
the inner bottom wall portion has a first end and a second end opposite to the first end, the first end is fixed, the second end is connected to an end of the side wall portion, and a portion between the first end and the second end is connected to the connection portion, and wherein the coil causes the eddy current to occur in the one surface of the side wall portion, and causes the outer bottom wall portion to vibrate by way of the inner bottom wall portion and the connection portion, by using the Lorentz force occurring in the side wall portion because of the interaction between the eddy current and the magnetic field generated by the magnet.

8. The ultrasound probe according to claim 7, wherein the side wall portion includes a first flat-shaped side wall portion and a second flat-shaped side wall portion which face each other, the inner bottom wall portion includes a first inner bottom wall portion whose one flat surface faces a flat surface of the outer bottom wall portion, the flat surface of the outer bottom wall portion being opposite to the vibration surface, and a second inner bottom wall portion whose one flat surface faces the flat surface of the outer bottom wall portion, the flat surface of the outer bottom wall portion being opposite to the vibration surface, the connection portion includes a first connection portion that connects the first inner bottom wall portion and the outer bottom wall portion and, a second connection portion that connects the second inner bottom wall portion and the outer bottom wall portion, the first inner bottom wall portion has a first end and a second end opposite to the first end, the first end is fixed, the second end is connected to an end of the first side wall portion, and a portion between the first end and the second end is connected to the first connection portion, and the second inner bottom wall portion has a first end and a second end opposite to the first end, the first end is fixed, the second end is connected to an end of the second side wall portion, and a portion between the first end and the second end is connected to the second connection portion, and wherein the ultrasound probe includes, as the coil, a first coil mounted on a first surface of the first side wall portion, the first surface being opposite to a second surface, of the first side wall portion, facing the second side wall portion, and a second coil mounted on a first surface of the second side wall portion, the first surface being opposite to a second surface, of the second side wall portion, facing the first side wall portion, and the ultrasound probe includes, as the magnet, at least one or more magnets mounted in such a way as to sandwich the first coil between the one or more magnets and the first surface of the first side wall portion, the first surface being opposite to the second surface, of the first side wall portion, facing the second side wall portion, and at least one or more magnets mounted in such a way as to sandwich the second coil between the one or more magnets and the first surface of the second side wall portion, the first surface being opposite to the second surface, of the second side wall portion, facing the first side wall portion.

9. The ultrasound probe according to claim 7, wherein the metal case has a polygonal prism shape in which the side wall portion is defined as a side face, the vibration surface of the outer bottom wall portion has a shape similar to that of a bottom face of the polygonal prism shape, and the ultrasound probe includes a number of combinations each having the coil and at least one or more of the magnets, the number of combinations being equal to the number of multiple planes in an outer surface of the side wall portion, and wherein each of the combinations whose number is equal to the number of multiple planes is mounted on a corresponding plane out of the multiple planes in such a way that the combinations are arranged at positions which are mutually rotationally symmetric with respect to an axis passing through a center of the vibration surface of the outer bottom wall portion and being perpendicular to the vibration surface of the outer bottom wall portion.

10. The ultrasound probe according to claim 7, wherein the metal case has a cylindrical shape in which the side wall portion is defined as a side face, the vibration surface of the outer bottom wall portion has a shape similar to that of a bottom face of the cylindrical shape, and the ultrasound probe includes multiple combinations each having the coil and at least one or more of the magnets, and wherein each of the multiple combinations is mounted on an outer surface of the side wall portion in such a way that the combinations are arranged at positions which are mutually rotationally symmetric with respect to an axis passing through a center of the vibration surface of the outer bottom wall portion and being perpendicular to the vibration surface of the outer bottom wall portion.

* * * * *